United States Patent
Ciardi et al.

(10) Patent No.: US 11,410,488 B2
(45) Date of Patent: Aug. 9, 2022

(54) AUGMENTED REALITY VIRTUAL OBJECT COLLECTION BASED ON SYMBOL COMBINATIONS

(71) Applicant: IGT, Las Vegas, NV (US)

(72) Inventors: Emilia Ciardi, Lavena Ponte Tresa (IT); Charles Cohen, San Francisco, CA (US)

(73) Assignee: IGT, Las Vegas, NV (US)

( * ) Notice: Subject to any disclaimer, the term of this patent is extended or adjusted under 35 U.S.C. 154(b) by 242 days.

(21) Appl. No.: 16/402,790

(22) Filed: May 3, 2019

(65) Prior Publication Data
US 2020/0349801 A1 Nov. 5, 2020

(51) Int. Cl.
*G07F 17/00* (2006.01)
*G07F 19/00* (2006.01)
*G07F 17/32* (2006.01)
*G06T 19/00* (2011.01)

(52) U.S. Cl.
CPC ........ *G07F 17/3211* (2013.01); *G06T 19/006* (2013.01); *G07F 17/3223* (2013.01); *G07F 17/3286* (2013.01); *A63F 2300/8082* (2013.01); *G07F 17/3295* (2013.01)

(58) Field of Classification Search
CPC ........... A63F 2300/8082; A63F 13/216; G07F 17/3211; G07F 17/3223; G07F 17/3286; G07F 17/3295; G06T 19/006
See application file for complete search history.

(56) References Cited

U.S. PATENT DOCUMENTS

| | | | |
|---|---|---|---|
| 8,235,529 B1 | 8/2012 | Raffle et al. | |
| 8,282,491 B2 * | 10/2012 | Auterio | A63F 13/00 463/42 |
| 8,558,759 B1 | 10/2013 | Prada et al. | |
| 8,821,274 B2 | 9/2014 | Lyons et al. | |
| 8,943,420 B2 | 1/2015 | Goldthwaite et al. | |
| 8,965,460 B1 * | 2/2015 | Rao | H04N 1/00307 455/566 |
| 9,280,867 B2 | 3/2016 | Froy et al. | |
| 9,280,868 B2 | 3/2016 | Froy et al. | |
| 9,285,592 B2 | 3/2016 | Olsson et al. | |
| 9,412,201 B2 | 8/2016 | Kinnebrew et al. | |
| 9,558,612 B2 | 1/2017 | Lyons et al. | |
| 9,568,620 B2 | 1/2017 | Froy et al. | |
| 9,569,920 B2 | 2/2017 | Froy et al. | |
| 2003/0104824 A1 * | 6/2003 | Hale | G09B 5/125 455/456.1 |

(Continued)

*Primary Examiner* — Milap Shah
*Assistant Examiner* — Jason Pinheiro
(74) *Attorney, Agent, or Firm* — Sage Patent Group

(57) ABSTRACT

Systems and methods are provided. A system is operable to provide, via a communication interface and to an augmented reality (AR) device that is associated with a user, symbol combination data that defines a first combination of symbols that are displayable on a gaming device. The system further provides a first virtual symbol that is collected by the AR device responsive to an image capture device of the AR device capturing image data that corresponds to the first combination of symbols. The system receives virtual symbol data from the AR device indicating that the AR device has collected the first virtual symbol. The system sends award data that corresponds to the first virtual symbol and that is redeemable by the user to the AR device.

19 Claims, 15 Drawing Sheets

(56) References Cited

U.S. PATENT DOCUMENTS

| | | | |
|---|---|---|---|
| 2005/0049022 A1* | 3/2005 | Mullen | A63F 13/42 463/1 |
| 2006/0105838 A1* | 5/2006 | Mullen | A63F 13/00 463/31 |
| 2007/0190494 A1* | 8/2007 | Rosenberg | A63F 13/79 434/11 |
| 2008/0167129 A1* | 7/2008 | Aaron | A63F 13/216 463/42 |
| 2009/0005140 A1* | 1/2009 | Rose | A63F 13/12 463/7 |
| 2009/0017913 A1* | 1/2009 | Bell | A63F 13/35 463/40 |
| 2010/0016080 A1* | 1/2010 | Garden | A63F 13/71 463/41 |
| 2010/0203933 A1* | 8/2010 | Eyzaguirre | A63H 13/10 463/2 |
| 2011/0151955 A1* | 6/2011 | Nave | A63F 13/837 463/2 |
| 2011/0225069 A1* | 9/2011 | Cramer | G06Q 30/06 705/27.1 |
| 2012/0122558 A1 | 5/2012 | Lyons | |
| 2012/0122570 A1* | 5/2012 | Baronoff | A63F 13/79 463/31 |
| 2012/0231887 A1* | 9/2012 | Lee | A63F 13/217 463/39 |
| 2013/0178257 A1* | 7/2013 | Langseth | A63F 13/812 463/4 |
| 2013/0203489 A1 | 8/2013 | Lyons | |
| 2014/0121015 A1 | 5/2014 | Massing et al. | |
| 2014/0168261 A1 | 6/2014 | Margolis et al. | |
| 2015/0065219 A1* | 3/2015 | Kiely | G07F 17/3225 463/13 |
| 2016/0373570 A1 | 12/2016 | Scavezze et al. | |
| 2018/0021671 A1 | 1/2018 | Liesenfelt | |
| 2018/0349703 A1 | 1/2018 | Liesenfelt | |
| 2019/0340632 A1* | 11/2019 | Bethke | H04L 67/38 |

\* cited by examiner

AUGMENTED REALITY VIRTUAL OBJECT COLLECTION BASED ON SYMBOL COMBINATIONS

BACKGROUND

Embodiments described herein relate to augmented reality systems and methods, and in particular to gaming enterprises that interact with gaming devices.

Gaming devices, such as electronic gaming machines (EGMs) may be capable of attracting players based primarily on a specific game provided by the EGM. However, any given EGM may be unable to maintain a player's interest for sustained periods of time just based on the primary game provided by the EGM. Methods of increasing brand loyalty to specific games and sustained interest are desired.

BRIEF SUMMARY

A system according to some embodiments includes a communication interface, a processing circuit, and a memory coupled to the processing circuit. The memory includes machine readable instructions that, when executed by the processing circuit, cause the processing circuit to provide, via the communication interface and to an augmented reality (AR) device that is associated with a user, symbol combination data that defines a first combination of symbols that are displayable on a gaming device and provide, via the communication interface and to the AR device, a first virtual symbol that is collected by the AR device responsive to an image capture device of the AR device capturing image data that corresponds to the first combination of symbols, wherein the AR device displays the first virtual symbol and the first combination of symbols on a display device of the AR device and stores virtual symbol data. The processing circuit is further caused to receive, from the AR device, virtual symbol data indicating that the AR device has collected the first virtual symbol and send, to the AR device, award data that corresponds to the first virtual symbol and that is redeemable by the user.

Some embodiments are directed to a method that includes operations of receiving, via a communication interface in an AR device and from a server, symbol combination data that defines multiple combinations of symbols that are displayable on a gaming device and that are viewable on a display of the AR device. Operations include receiving, via the communication interface in the AR device and from the server, multiple virtual symbols that correspond to the combinations of symbols and that are collected by the AR device responsive to an image capture device of the AR device capturing image data that corresponds to ones of the combinations of symbols. Operations include sending, via the communication interface in the AR device and to the server, virtual symbol data indicating which of the virtual symbols that the AR device has collected and receiving, by the AR device, award data that corresponds to ones of the virtual symbols that have been collected and that is redeemable by a user of the AR device.

Some embodiments are directed to a system that includes a processing circuit and a memory coupled to the processing circuit. The memory includes machine readable instructions that, when executed by the processing circuit, cause the processing circuit to provide, to an augmented reality (AR) device that is associated with a user, symbol combination data that defines multiple combinations of symbols that are displayable on a gaming device and to provide, to the AR device, multiple virtual symbols that correspond to the combinations of symbols and that are collected by the AR device responsive to an image capture device of the AR device capturing image data that corresponds to ones of the combinations of symbols. In some embodiments, the AR device displays one of the virtual symbols and a corresponding one of the combinations of symbols on a display device of the AR device. Some embodiments include receiving, from the AR device, virtual symbol data indicating that the AR device has collected one of the plurality of virtual symbols and sending, to the AR device, award data that corresponds to the one of the virtual symbols that has been collected, the award data being redeemable by the user. In some embodiments, the combinations of symbols include non-winning combinations of symbols in the gaming device. Some embodiments provide that the virtual symbols include a first virtual symbol and a second virtual symbol that is collected after the first virtual symbol. In some embodiments, an action of the first virtual symbol is determined based on content of the second virtual symbol.

DETAILED DESCRIPTION

Figure 1:
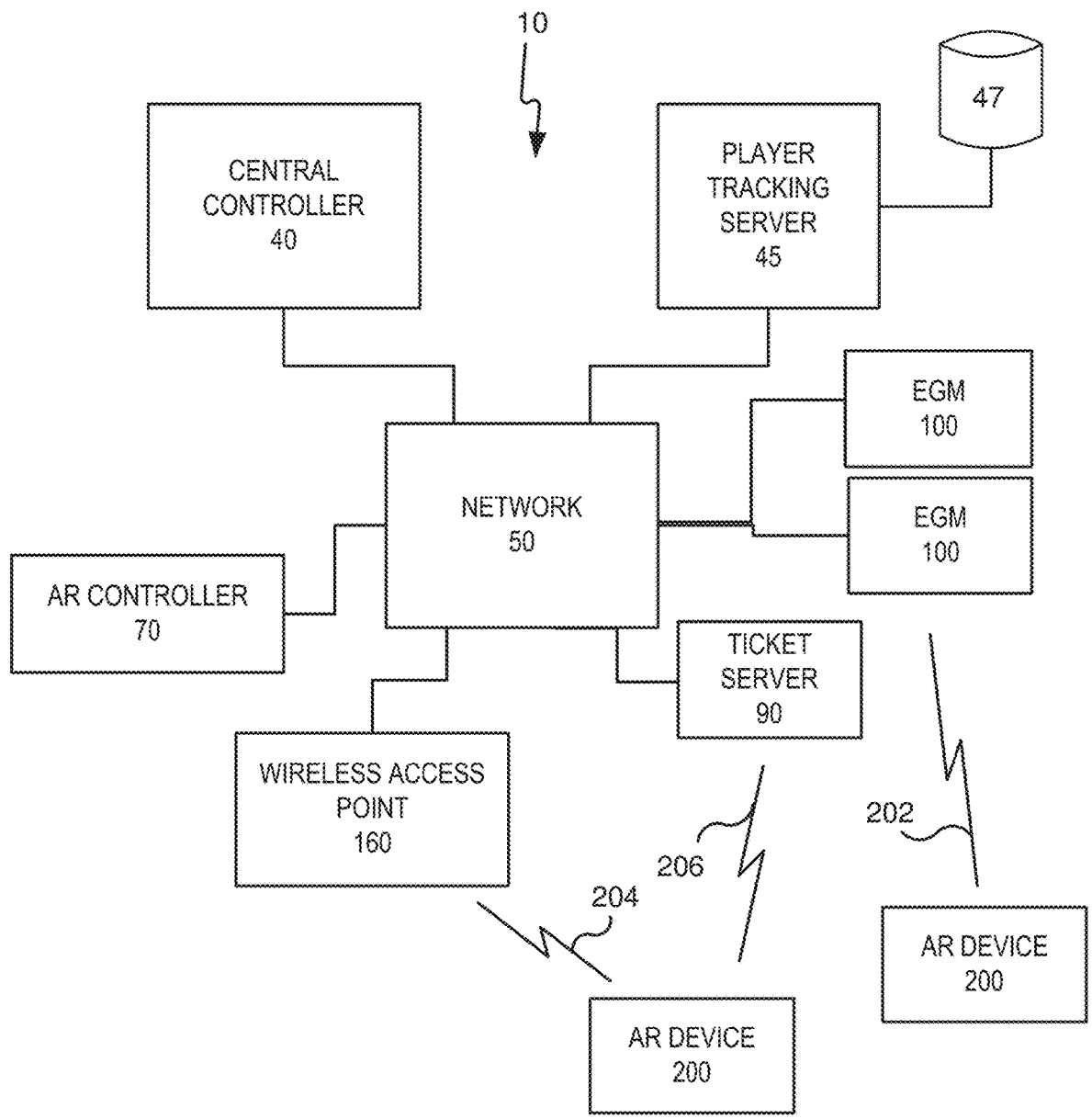
FIG. 1 is a schematic block diagram illustrating a network configuration for a plurality of gaming devices according to some embodiments.

It may be advantageous to engage players in a manner that encourages continued play to complete collections of virtual objects. Such engagement may increase player loyalty to specific games and/or specific game themes. As such, inventive concepts herein provide a technological solution using augmented reality (AR) to increase player loyalty to specific games and/or specific game themes.

Inventive concepts herein provide an augmented reality experience through which players may collect different virtual representations of items (virtual objects) corresponding to specific combinations of symbols that are output on EGMs. Players may be presented with awards based on collecting all of the virtual objects in a given collection. Operations herein may provide for active collecting corresponding to multiple different collections.

In some embodiments, an AR device may be a mobile device that may include an application that provides an augmented reality (AR) delivered collection of virtual objects that correspond to specific combinations of symbols that are output by a gaming device, such as an EGM. The mobile device may capture that the specific combination is output by the EGM and then cause a symbol that relates to the combination to be collected by the player via the mobile device.

In some cases, the specific combinations that correspond to collecting a virtual object are not winning combinations otherwise.

By using the output of the EGM as the catalyst for collecting virtual objects, the player may be encouraged to play the EGM more and/or longer. The AR may display that the virtual object is available at a given EGM by generating the virtual object at a given position on the EGM and/or on a ticket output from the EGM. Additionally, stickers, signs or posters may be located in a conspicuous manner to be scanned by the mobile device, which may show the virtual object. In such embodiments, the virtual object may be collected at various locations and may incentivize the player to go to and/or return to the EGM.

Once a first virtual object is collected, other virtual objects that may correspond to the first virtual object may be collected and used in conjunction with the first virtual object. For example, where the first virtual object is a T-Rex, a player may be incentivized to collect virtual food for the T-Rex. Some of the food may be favorably received by the T-Rex, while other food may be rejected by the T-Rex. For example, the T-Rex may respond favorably to meat and reject vegetables.

The AR device may receive location data from an AR server that identifies the location based on image analysis of the viewable content around the location. Once the player collects all of the virtual objects in a collection, the player may receive an award such as a voucher. The voucher may be redeemed at a game machine corresponding to the given brand and/or may be used at other casino floor attractions.

In some embodiments, a mobile terminal may be used instead of a traditional EGM. For example, a gaming experience such as may be provided on an EGM and/or a sports betting terminal may be provided to a player using a computing device, such as a smart phone, tablet, laptop and/or desktop computer, among others.

In a sports betting context, a sports betting terminal may have virtual objects that correspond to the sport. For example, the virtual objects may be team logos and may be collected based on scanning sports betting terminals or monitors. The collection may be defined as completed based on collecting a given number of team logos.

Embodiments may correspond to the application on the AR device and/or and AR server that operates with the AR device. For example, some embodiments provide that the AR server provides the image data corresponding to the virtual object.

Augmented Reality EGM Systems and Viewers

Referring to FIG. 1, a gaming system 10 including a plurality of EGMs 100 is illustrated. As discussed above, the EGMs 100 may be one type of a variety of different types of gaming devices. The gaming system 10 may be located, for example, on the premises of a gaming establishment, such as a casino. The EGMs 100, which are typically situated on a casino floor, may be in communication with each other and/or at least one central controller 40 through a data communication network 50 that may include a remote communication link. The data communication network 50 may be a private data communication network that is operated, for example, by the gaming facility that operates the EGMs 100. Communications over the data communication network 50 may be encrypted for security. The central controller 40 may be any suitable server or computing device which includes at least one processing circuit and at least one memory or storage device. Each EGM 100 may include a processing circuit that transmits and receives events, messages, commands or any other suitable data or signal between the EGM 100 and the central controller 40. The EGM processing circuit is operable to execute such communicated events, messages or commands in conjunction with the operation of the EGM 100. Moreover, the processing circuit of the central controller 40 is configured to transmit and receive events, messages, commands or any other suitable data or signal between the central controller 40 and each of the individual EGMs 100. In some embodiments, one or more of the functions of the central controller 40 may be performed by one or more EGM processing circuits. Moreover, in some embodiments, one or more of the functions of one or more EGM processing circuits as disclosed herein may be performed by the central controller 40.

A wireless access point 160 provides wireless access to the data communication network 50. The wireless access point 160 may be connected to the data communication network 50 as illustrated in FIG. 1, and/or may be connected directly to the central controller 40 or another server connected to the data communication network 50.

A player tracking server 45 may also be connected through the data communication network 50. The player tracking server 45 may manage a player tracking account that tracks the player's gameplay and spending and/or other player preferences and customizations, manages loyalty awards for the player, manages funds deposited or advanced on behalf of the player, and other functions. Player information managed by the player tracking server 45 may be stored in a player information database 47.

As further illustrated in FIG. 1, the gaming system 10 may include a ticket server 90 that is configured to print and/or dispense wagering tickets. The ticket server 90 may be in communication with the central controller 40 through the data network 50. Each ticket server 90 may include a processing circuit that transmits and receives events, messages, commands or any other suitable data or signal between the ticket server 90 and the central controller 40. The ticket server 90 processing circuit may be operable to execute such communicated events, messages or commands in conjunction with the operation of the ticket server 90.

Moreover, in some embodiments, one or more of the functions of one or more ticket server 90 processing circuits as disclosed herein may be performed by the central controller 40.

As further illustrated in FIG. 1, an AR device 200, is provided. The AR device 200 communicates with one or more elements of the gaming system 10 to render two-dimensional (2D) and/or three-dimensional (3D) content to a player of one of the EGMs 100 and/or the ticket server 90 in a virtual space, while at the same time allowing the player to see objects in the real space around the player. That is, the AR device 200 combines a virtual image from AR display content with real images perceived by the user, including images of real objects as well as objects printed on the wagering ticket. In this manner, the AR device 200 "mixes" real and virtual reality into a single viewing experience for the player. In some embodiments, the AR device 200 may be further configured to enable the player to interact with both the real and virtual objects displayed to the player by the AR device 200.

The AR device 200 communicates with one or more elements of the system 10 to coordinate the rendering of mixed reality images. For example, in some embodiments, the AR device 200 may communicate directly with the ticket server 90 over a wireless interface 202, which may be a WiFi link, a Bluetooth link, an NFC link, etc. In other embodiments, the AR device 200 may communicate with the data communication network 50 (and devices connected thereto, including EGMs and the coin pusher) over a wireless interface 204 with the wireless access point 160. The wireless interface 204 may include a WiFi link, a Bluetooth link, an NFC link, etc. In still further embodiments, the AR device 200 may communicate simultaneously with both the ticket server 90 over the wireless interface 206 and the wireless access point 160 over the wireless interface 204. Some embodiments provide that AR device 200 may communicate with one or more of the EGMs 100 over a wireless interface 202. In these embodiments, wireless interface 202, wireless interface 204 and wireless interface 206 may use different communication protocols and/or different communication resources, such as different frequencies, time slots, spreading codes, etc. For example, in some embodiments, the wireless interface 202 may be a Bluetooth link, while the wireless interface 204 and/or 206 may be a WiFi link.

The wireless interfaces 202, 204, 206 allow the AR device 200 to coordinate the generation and rendering of mixed reality images to the player via the AR device 200.

In some embodiments, the gaming system 10 includes a mixed reality controller, or AR controller 70. The AR controller 70 may be a computing system that communicates through the data communication network 50 with the ticket server 90 and the AR devices 200 to coordinate the generation and rendering of virtual images to one or more players using the AR devices 200. The AR controller 70 may be implemented within or separately from the central controller 40.

In some embodiments, the AR controller 70 may coordinate the generation and display of the virtual images of the same virtual object to more than one player by more than one AR device 200. As described in more detail below, this may enable multiple players to interact with the same virtual object together in real time. This feature can be used to provide a shared multiplayer experience to multiple players at the same time.

Moreover, in some embodiments, the AR controller 70 may coordinate the generation and display of the same virtual object to players at different physical locations, as will be described in more detail below.

Referring to FIGS. 2A to 2D, the AR device 200 may be implemented in a number of different ways. For example, referring to FIG. 2A, in some embodiments, an AR device 200A may be implemented as a 3D headset including a pair of semitransparent lenses 212 on which images of virtual objects may be displayed. Different stereoscopic images may be displayed on the lenses 212 to create an appearance of depth, while the semitransparent nature of the lenses 212 allows the user to see both the real world as well as the 3D image rendered on the lenses 212. The AR device 200A may be implemented, for example, using a Hololens from Microsoft Corporation. The Microsoft Hololens includes a plurality of cameras 234 and other sensors 211 that the device uses to build a 3D model of the space around the user. The device 200A can generate a 3D image to display to the user that takes into account the real-world objects around the user and allows the user to interact with the 3D object.

The device 200A may further include other sensors 232, such as a gyroscopic sensor, a GPS sensor, one or more accelerometers, and/or other sensors that allow the device 200A to determine its position and orientation in space. In further embodiments, the device 200A may include one or more cameras that allow the device 200A to determine its position and/or orientation in space using visual simultaneous localization and mapping (VSLAM). The device 200A may further include one or more microphones and/or speakers 235 that allow the user to interact audially with the device.

Figure 2A:
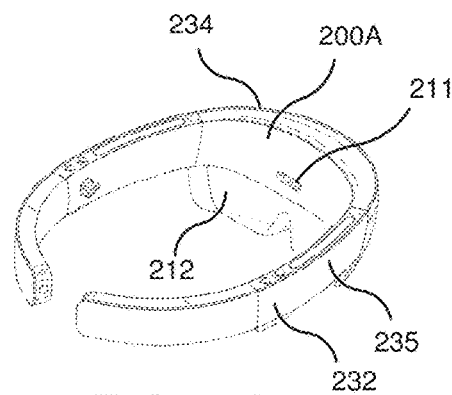
FIGS. 2A to 2D illustrate augmented reality viewing devices according to various embodiments.
Figure 2B:
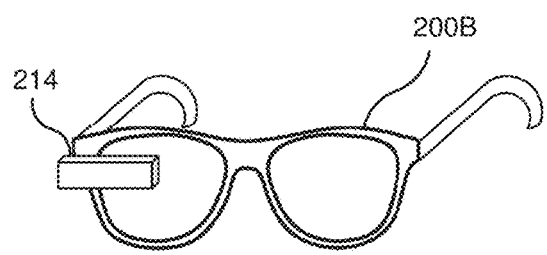

Referring to FIG. 2B, an AR device 200B may be implemented as a pair of glasses 200B including a transparent prismatic display 214 that displays an image to a single eye of the user. An example of such a device is the Google Glass device. Such a device may be capable of displaying images to the user while allowing the user to see the world around the user, and as such can be used as a mixed reality viewer.

Figure 2C:
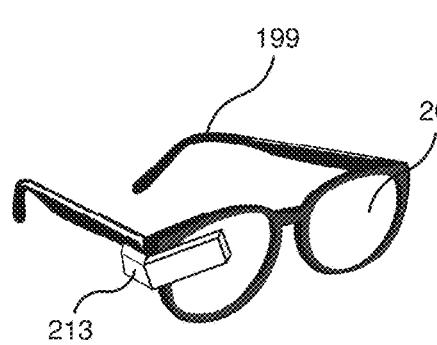

In other embodiments, referring to FIG. 2C, the AR device may be implemented using a virtual retinal display device 200C. In contrast to devices that display an image within the field of view of the user, a virtual retinal display 200C may raster scan an image directly onto the retina of the user. In some embodiments, the virtual retinal display 200C may include glasses 199 that may support and/or position virtual retinal display 200C relative to the user's eyes. In some embodiments, the virtual retinal display 200C may be configured to be removably coupled to glasses that are not provided with the virtual retinal display 200C. In such embodiments, the virtual retinal display may be used in conjunction with user supplied glasses 199 that may include lenses for correcting vision impairments. Like the device 200B, the virtual retinal display device 200C combines the displayed image with surrounding light to allow the user to see both the real world and the displayed image. However, also like the device 200B, the virtual retinal display device 200C may be incapable of displaying 3D images to the user.

Figure 2D:
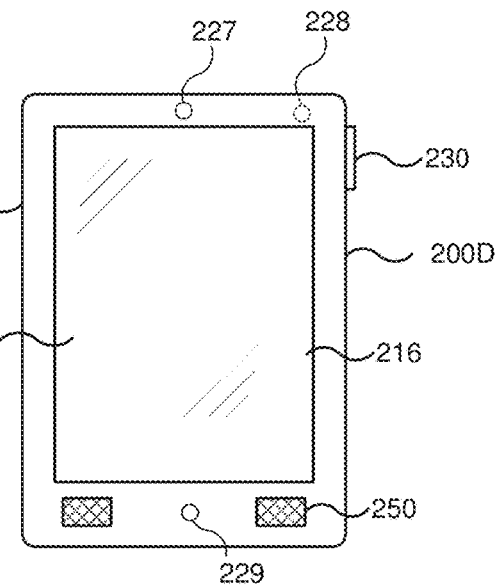

In still further embodiments, an AR device 200D, as shown in FIG. 2D, may be implemented using a mobile wireless device, such as a mobile telephone, a tablet computing device, a personal digital assistant, or the like. The device 200D may be a handheld device including a housing 205 on which a touchscreen display device 216 including a digitizer 252 is provided. An input button 230 may be provided on the housing and may act as a power or control button. A rear facing camera 227 may be provided in a front face of the housing 205. The device 200D may further include a front facing camera 228 on a rear face of the housing 205. The device 200D may include one or more speakers 250 and a microphone 229. The device 200D may provide a mixed reality display by capturing a video signal using the front facing camera 228 and displaying the video signal on the display device 216, and also displaying a rendered image of a virtual object over the captured video signal. In this manner, the user may see both a mixed image of both a real object in front of the device 200D as well as a virtual object superimposed over the real object to provide a mixed reality viewing experience.

Figure 2E:
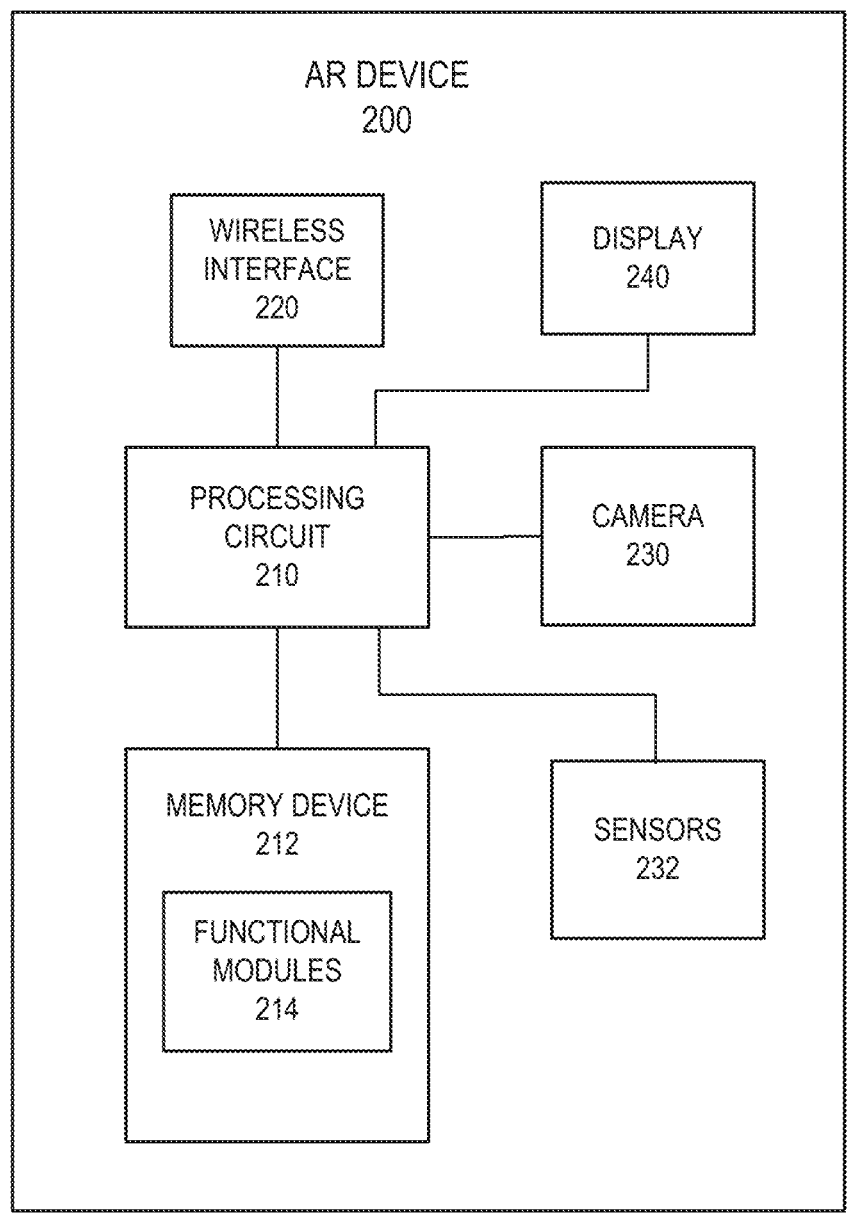
FIG. 2E is a schematic block diagram of an augmented reality device according to some embodiments.

FIG. 2E is a block diagram that illustrates various components of an AR device 200 according to some embodiments. As shown in FIG. 2E, the AR device 200 may include a processing circuit 210 that controls operations of the AR device 200. Although illustrated as a single processing circuit, multiple special purpose and/or general purpose processors and/or processor cores may be provided in the AR device 200. For example, the AR device 200 may include one or more of a video processor, a signal processor, a sound processor and/or a communication controller that performs one or more control functions within the AR device 200. The processing circuit 210 may be variously referred to as a "controller," "microcontroller," "microprocessor" or simply a "computer." The processing circuit 210 may further include one or more application-specific integrated circuits (ASICs).

Various components of the AR device 200 are illustrated in FIG. 2E as being connected to the processing circuit 210. It will be appreciated that the components may be connected to the processing circuit 210 through a system bus, a communication bus and controller, such as a USB controller and USB bus, a network interface, or any other suitable type of connection.

The AR device 200 further includes a camera 230 for generating a video signal and a display 240 for displaying AR graphics to a user as virtual images or virtual elements. The AR graphics may be displayed directly within a field of view so as to appear to be present within a scene and/or may be digitally added to a live video signal so as to appear to be present within the live video signal.

The AR device 200 further includes a memory device 212 that stores one or more functional modules 214 for performing the operations described herein.

The memory device 212 may store program code and instructions, executable by the processing circuit 210, to control the AR device 200. The memory device 210 may include random access memory (RAM), which can include volatile and/or non-volatile RAM (NVRAM) and other forms as commonly understood in the gaming industry. In some embodiments, the memory device 212 may include read only memory (ROM). In some embodiments, the memory device 212 may include flash memory and/or EEPROM (electrically erasable programmable read only memory). Any other suitable magnetic, optical and/or semiconductor memory may operate in conjunction with the gaming device disclosed herein.

The AR device 200 may include a wireless interface 220 that enables the AR device 200 to communicate with remote devices, such as EGMs 100 and/or an AR controller 70 over a wired and/or wireless communication network, such as a local area network (LAN), wide area network (WAN), cellular communication network, wireless LAN (Wifi), Bluetooth, near-field communications (NFC) or other data communication network. The wireless interface 220 may include multiple radios to support multiple types of simultaneous connections. For example, the wireless interface may include both a Wifi radio transceiver and a Bluetooth radio transceiver.

Electronic Gaming Machines

Figure 3A:
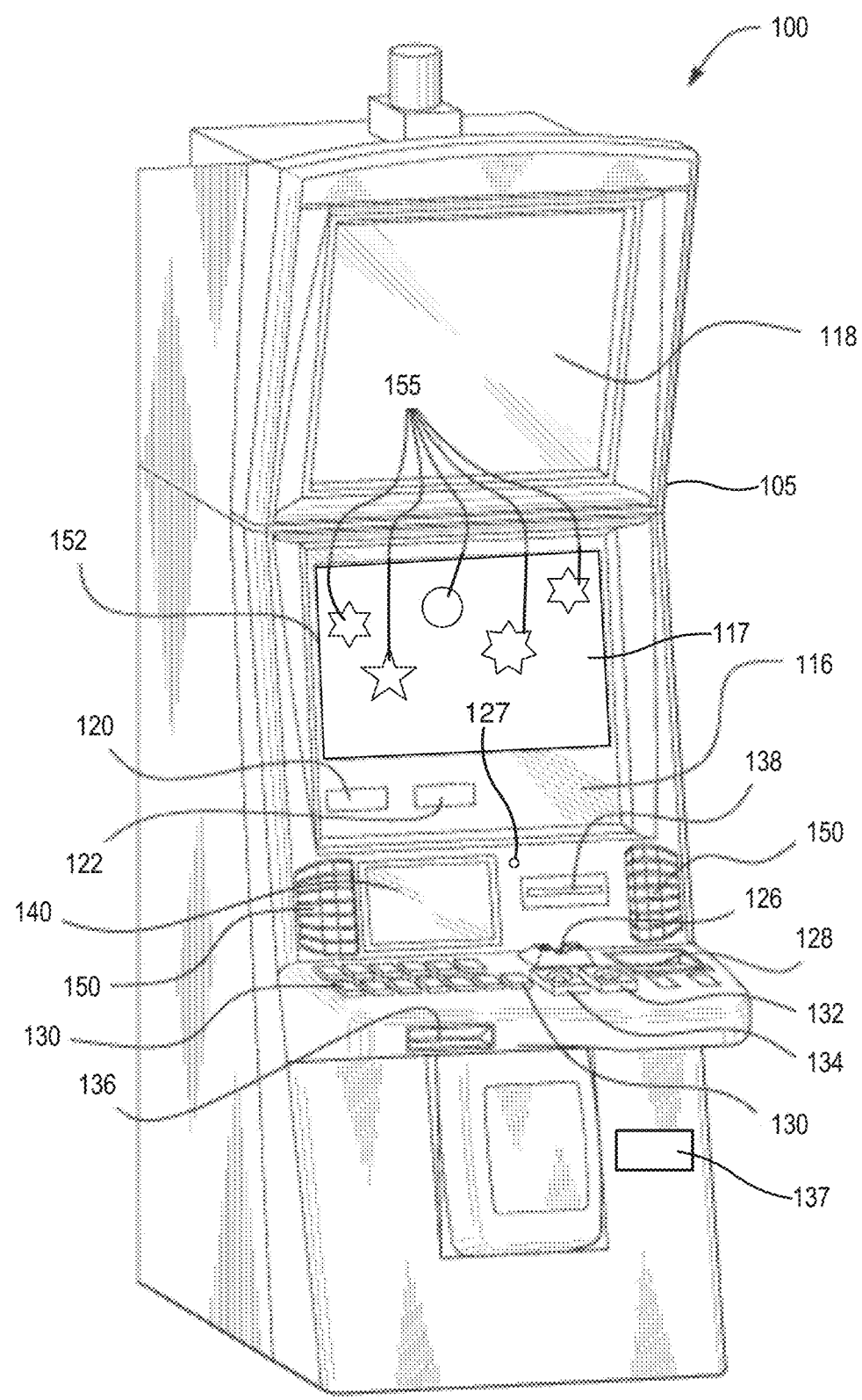
FIG. 3A is a perspective view of a gaming device that can be configured according to some embodiments.
Figure 3B:
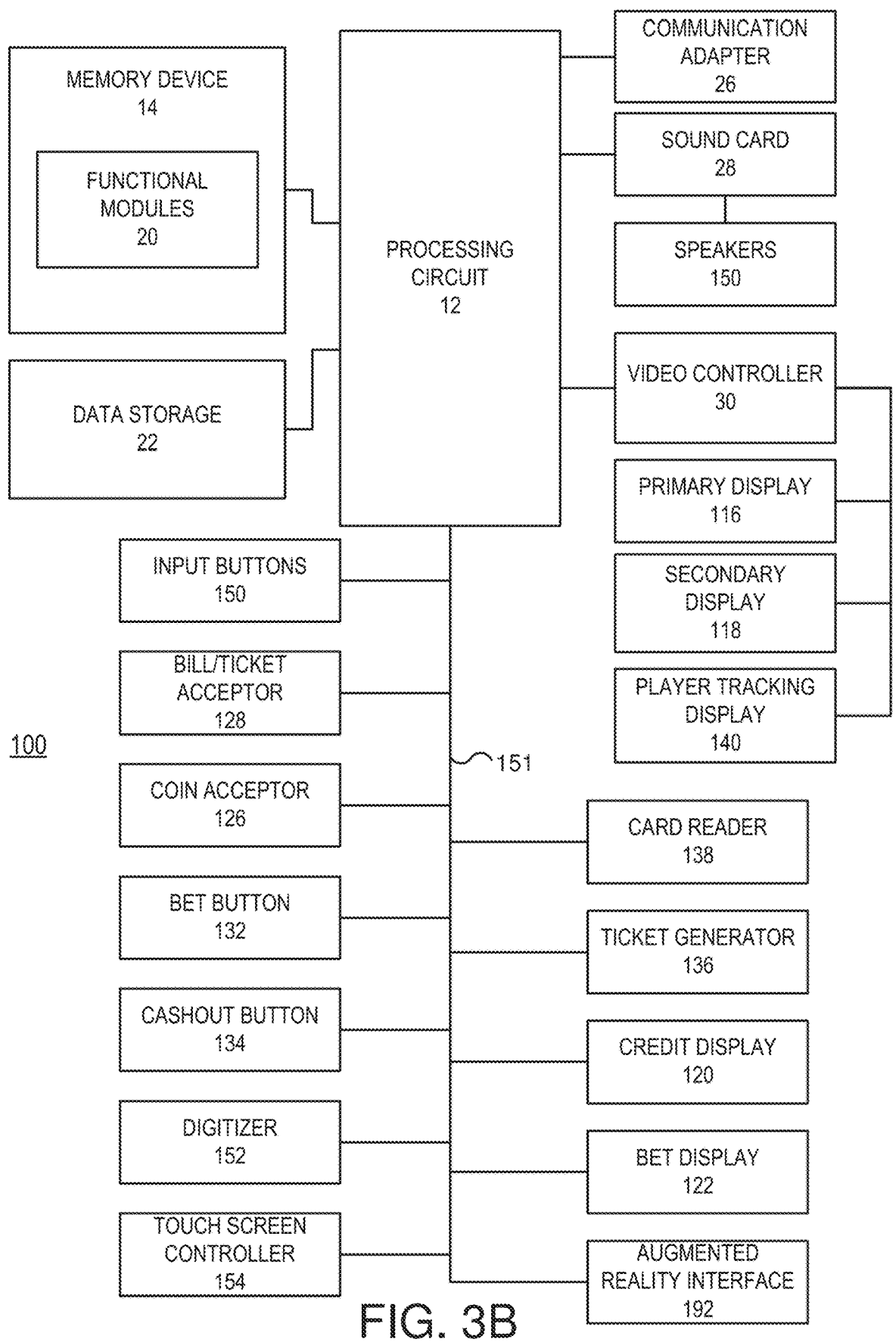
FIG. 3B is a schematic block diagram illustrating an electronic configuration for a gaming device according to some embodiments.
Figure 3C:
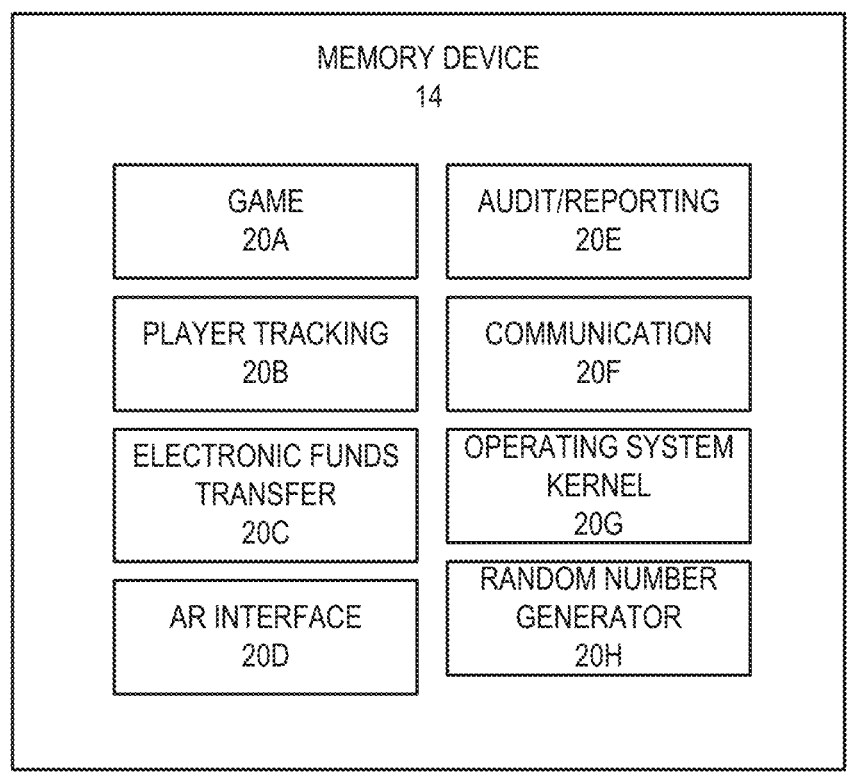
FIG. 3C is a schematic block diagram that illustrates various functional modules of a gaming device according to some embodiments.

Embodiments herein may include different types of gaming devices. One example of a gaming device includes an electronic gaming machine (EGM) 100 that can interact with mixed reality viewers according to various embodiments is illustrated in FIGS. 3A, 3B, and 3C in which FIG. 3A is a perspective view of an EGM 100 illustrating various physical features of the device, FIG. 3B is a functional block diagram that schematically illustrates an electronic relationship of various elements of the EGM 100, and FIG. 3C illustrates various functional modules that can be stored in a memory device of the EGM 100. The embodiments shown in FIGS. 3A to 3C are provided as examples for illustrative purposes only. It will be appreciated that EGMs may come in many different shapes, sizes, layouts, form factors, and configurations, and with varying numbers and types of input and output devices, and that embodiments of the inventive concepts are not limited to the particular EGM structures described herein.

EGMs 100 typically include a number of standard features, many of which are illustrated in FIGS. 3A and 3B. For example, referring to FIG. 3A, an EGM 100 may include a support structure, housing or cabinet 105 which provides support for a plurality of displays, inputs, outputs, controls and other features that enable a player to interact with the EGM 100.

The EGM 100 illustrated in FIG. 3A includes a number of display devices, including a primary display device 116 located in a central portion of the cabinet 105 and a secondary display device 118 located in an upper portion of the cabinet 105. A plurality of game components 155 are displayed on a display screen 117 of the primary display device 116. It will be appreciated that one or more of the display devices 116, 118 may be omitted, or that the display devices 116, 118 may be combined into a single display device. The EGM 100 may further include a player tracking display 140, a credit display 120, and a bet display 122. The credit display 120 displays a player's current number of credits, cash, account balance or the equivalent. The bet display 122 displays a player's amount wagered. Locations of these displays are merely illustrative as any of these displays may be located anywhere on the EGM 100.

The player tracking display 140 may be used to display a service window that allows the player to interact with, for example, their player loyalty account to obtain features, bonuses, comps, etc. In other embodiments, additional display screens may be provided beyond those illustrated in FIG. 3A. In some embodiments, one or more of the player tracking display 140, the credit display 120 and the bet display 122 may be displayed in one or more portions of one or more other displays that display other game related visual content. For example, one or more of the player tracking display 140, the credit display 120 and the bet display 122 may be displayed in a picture in a picture on one or more displays.

The EGM 100 may further include a number of input devices 130 that allow a player to provide various inputs to the EGM 100, either before, during or after a game has been played. For example, the EGM 100 may include input devices 130 that are a plurality of input buttons 130 that allow the player to select options before, during or after game play. The EGM may further include a game play initiation button 132 and a cashout button 134. The cashout button 134 is utilized to receive a cash payment or any other suitable form of payment corresponding to a quantity of remaining credits of a credit display.

In some embodiments, one or more input devices of the EGM 100 are one or more game play activation devices that are each used to initiate a play of a game on the EGM 100 or a sequence of events associated with the EGM 100 following appropriate funding of the EGM 100. The example EGM 100 illustrated in FIGS. 3A and 3B includes a game play activation device in the form of a game play initiation button 132. It should be appreciated that, in other embodiments, the EGM 100 begins game play automatically upon appropriate funding rather than upon utilization of the game play activation device.

In some embodiments, one or more input devices 130 of the EGM 100 are one or more wagering or betting devices. One such wagering or betting device includes a maximum wagering or betting device that, when utilized, causes a maximum wager to be placed. Another such wagering or betting device is a repeat the bet device that, when utilized, causes the previously-placed wager to be placed. A further such wagering or betting device is a bet one device. A bet is placed upon utilization of the bet one device. The bet is increased by one credit each time the bet one device is utilized. Upon the utilization of the bet one device, a quantity of credits shown in a credit display (as described below) decreases by one, and a number of credits shown in a bet display (as described below) increases by one.

In some embodiments, one or more of the display screens may a touch-sensitive display that includes a digitizer 152 and a touchscreen controller 154 (FIG. 3B). The player may interact with the EGM 100 by touching virtual buttons on one or more of the display devices 116, 118, 140. Accordingly, any of the above described input devices, such as the input buttons 130, the game play initiation button 132 and/or the cashout button 134 may be provided as virtual buttons on one or more of the display devices 116, 118, 140.

Referring briefly to FIG. 3B, operation of the primary display device 116, the secondary display device 118 and the player tracking display 140 may be controlled by a video controller 30 that receives video data from a processing circuit 12 or directly from a memory device 14 and displays the video data on the display screen. The credit display 120 and the bet display 122 are typically implemented as simple LCD or LED displays that display a number of credits available for wagering and a number of credits being wagered on a particular game. Accordingly, the credit display 120 and the bet display 122 may be driven directly by the processing circuit 12. In some embodiments however, the credit display 120 and/or the bet display 122 may be driven by the video controller 30.

Referring again to FIG. 3A, the display devices 116, 118, 140 may include, without limitation: a cathode ray tube, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display devices 116, 118, 140 may include a touch-screen with an associated touch-screen controller 154 and digitizer 152. The display devices 116, 118, 140 may be of any suitable size, shape, and/or configuration. The display devices 116, 118, 140 may include flat or curved display surfaces.

The display devices 116, 118, 140 and video controller 30 of the EGM 100 are generally configured to display one or more game and/or non-game images, symbols, and indicia. In certain embodiments, the display devices 116, 118, 140 of the EGM 100 are configured to display any suitable visual representation or exhibition of the movement of objects; dynamic lighting; video images; images of people, characters, places, things, and faces of cards; and the like. In certain embodiments, the display devices 116, 118, 140 of the EGM 100 are configured to display one or more virtual reels, one or more virtual wheels, and/or one or more virtual dice. In other embodiments, certain of the displayed images, symbols, and indicia are in mechanical form. That is, in these embodiments, the display device 116, 118, 140 includes any electromechanical device, such as one or more rotatable wheels, one or more reels, and/or one or more dice, configured to display at least one or a plurality of game or other suitable images, symbols, or indicia.

The EGM 100 also includes various features that enable a player to deposit credits in the EGM 100 and withdraw credits from the EGM 100, such as in the form of a payout of winnings, credits, etc. For example, the EGM 100 may include a ticket dispenser 136, a bill/ticket acceptor 128, and a coin acceptor 126 that allows the player to deposit coins into the EGM 100.

As illustrated in FIG. 3A, the EGM 100 may also include a currency dispenser 137 that may include a note dispenser configured to dispense paper currency and/or a coin generator configured to dispense coins or tokens in a coin payout tray.

The EGM 100 may further include one or more speakers 150 controlled by one or more sound cards 28 (FIG. 3B). The EGM 100 illustrated in FIG. 3A includes a pair of speakers 150. In other embodiments, additional speakers, such as surround sound speakers, may be provided within or on the cabinet 105. Moreover, the EGM 100 may include built-in seating with integrated headrest speakers.

In various embodiments, the EGM 100 may generate dynamic sounds coupled with attractive multimedia images displayed on one or more of the display devices 116, 118, 140 to provide an audio-visual representation or to otherwise display full-motion video with sound to attract players to the EGM 100 and/or to engage the player during gameplay. In certain embodiments, the EGM 100 may display a sequence of audio and/or visual attraction messages during idle periods to attract potential players to the EGM 100. The videos may be customized to provide any appropriate information.

The EGM 100 may further include a card reader 138 that is configured to read magnetic stripe cards, such as player loyalty/tracking cards, chip cards, and the like. In some embodiments, a player may insert an identification card into a card reader of the gaming device. In some embodiments, the identification card is a smart card having a programmed microchip or a magnetic strip coded with a player's identification, credit totals (or related data) and other relevant information. In other embodiments, a player may carry a portable device, such as a cell phone, a radio frequency identification tag or any other suitable wireless device, which communicates a player's identification, credit totals (or related data) and other relevant information to the gaming device. In some embodiments, money may be transferred to a gaming device through electronic funds transfer. When a player funds the gaming device, the processing circuit determines the amount of funds entered and displays the corresponding amount on the credit or other suitable display as described above.

In some embodiments, the EGM 100 may include an electronic payout device or module configured to fund an electronically recordable identification card or smart card or a bank or other account via an electronic funds transfer to or from the EGM 100.

FIG. 3B is a block diagram that illustrates logical and functional relationships between various components of an EGM 100. As shown in FIG. 3B, the EGM 100 may include a processing circuit 12 that controls operations of the EGM 100. Although illustrated as a single processing circuit, multiple special purpose and/or general purpose processors and/or processor cores may be provided in the EGM 100. For example, the EGM 100 may include one or more of a video processor, a signal processor, a sound processor and/or a communication controller that performs one or more control functions within the EGM 100. The processing circuit 12 may be variously referred to as a "controller," "microcontroller," "microprocessor" or simply a "computer." The processor may further include one or more application-specific integrated circuits (ASICs).

Various components of the EGM 100 are illustrated in FIG. 3B as being connected to the processing circuit 12. It will be appreciated that the components may be connected to the processing circuit 12 through a system bus, a communication bus and controller, such as a USB controller and USB bus, a network interface, or any other suitable type of connection.

The EGM 100 further includes a memory device 14 that stores one or more functional modules 20. Various functional modules 20 of the EGM 100 will be described in more detail below in connection with FIG. 3D.

The memory device 14 may store program code and instructions, executable by the processing circuit 12, to control the EGM 100. The memory device 14 may also store other data such as image data, event data, player input data, random or pseudo-random number generators, pay-table data or information and applicable game rules that relate to the play of the gaming device. The memory device 14 may include random access memory (RAM), which can include non-volatile RAM (NVRAM), magnetic RAM (ARAM), ferroelectric RAM (FeRAM) and other forms as commonly understood in the gaming industry. In some embodiments, the memory device 14 may include read only memory (ROM). In some embodiments, the memory device 14 may include flash memory and/or EEPROM (electrically erasable programmable read only memory). Any other suitable magnetic, optical and/or semiconductor memory may operate in conjunction with the gaming device disclosed herein.

The EGM 100 may further include a data storage device 22, such as a hard disk drive or flash memory. The data storage 22 may store program data, player data, audit trail data or any other type of data. The data storage 22 may include a detachable or removable memory device, including, but not limited to, a suitable cartridge, disk, CD ROM, DVD or USB memory device.

The EGM 100 may include a communication adapter 26 that enables the EGM 100 to communicate with remote devices over a wired and/or wireless communication network, such as a local area network (LAN), wide area network (WAN), cellular communication network, or other data communication network. The communication adapter 26 may further include circuitry for supporting short range wireless communication protocols, such as Bluetooth and/or near field communications (NFC) that enable the EGM 100 to communicate, for example, with a mobile communication device operated by a player.

The EGM 100 may include one or more internal or external communication ports that enable the processing circuit 12 to communicate with and to operate with internal or external peripheral devices, such as eye tracking devices, position tracking devices, cameras, accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumb drives, ticket readers, touch screens, trackballs, touchpads, wheels, and wireless communication devices. In some embodiments, internal or external peripheral devices may communicate with the processing circuit through a universal serial bus (USB) hub (not shown) connected to the processing circuit 12.

In some embodiments, the EGM 100 may include a sensor, such as a camera in communication with the processing circuit 12 (and possibly controlled by the processing circuit 12) that is selectively positioned to acquire an image of a player actively using the EGM 100 and/or the surrounding area of the EGM 100. In one embodiment, the camera may be configured to selectively acquire still or moving (e.g., video) images and may be configured to acquire the images in either an analog, digital or other suitable format. The display devices 116, 118, 140 may be configured to display the image acquired by the camera as well as display the visible manifestation of the game in split screen or picture-in-picture fashion. For example, the camera may acquire an image of the player and the processing circuit 12 may incorporate that image into the primary and/or secondary game as a game image, symbol or indicia.

Various functional modules of that may be stored in a memory device 14 of an EGM 100 are illustrated in FIG. 3C. Referring to FIG. 3C, the EGM 100 may include in the memory device 14 a game module 20A that includes program instructions and/or data for operating a hybrid wagering game as described herein. The EGM 100 may further include a player tracking module 20B, an electronic funds transfer module 20C, a wide area progressive module 20D, an audit/reporting module 20E, a communication module 20F, an operating system 20G and a random number generator 20H. The player tracking module 20B keeps track of the play of a player. The electronic funds transfer module 20C communicates with a back end server or financial institution to transfer funds to and from an account associated with the player. The AR interface module 20D interacts with an AR device 200 as described in more detail below. The communication module 20F enables the EGM 100 to communicate with remote servers and other EGMs using various secure communication interfaces. The operating system kernel 20G controls the overall operation of the EGM 100, including the loading and operation of other modules. The random number generator 20H generates random or pseudorandom numbers for use in the operation of the hybrid games described herein.

In some embodiments, an EGM 100 comprises a personal device, such as a desktop computer, a laptop computer, a mobile device, a tablet computer or computing device, a personal digital assistant (PDA), or other portable computing devices. In some embodiments, the EGM 100 may be operable over a wireless network, such as part of a wireless gaming system. In such embodiments, the gaming machine may be a hand-held device, a mobile device or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission.

Figure 3D:
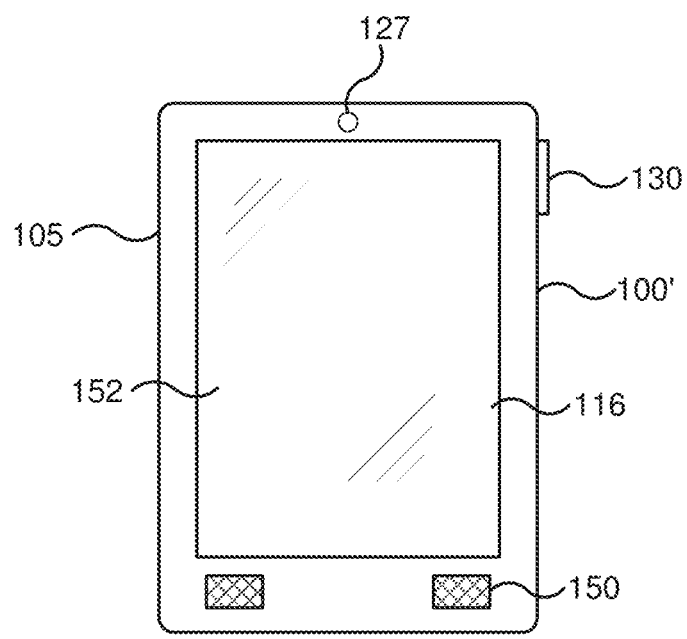
FIG. 3D is perspective view of a gaming device that can be configured according to some embodiments.

For example, referring to FIG. 3D, an EGM 100' may be implemented as a handheld device including a compact housing 105 on which is mounted a touchscreen display device 116 including a digitizer 152. An input button 130 may be provided on the housing and may act as a power or control button. A camera 127 may be provided in a front face of the housing 105. The housing 105 may include one or more speakers 150. In the EGM 100', various input buttons described above, such as the cashout button, gameplay activation button, etc., may be implemented as soft buttons on the touchscreen display device 116. Moreover, the EGM 100' may omit certain features, such as a bill acceptor, a ticket generator, a coin acceptor or dispenser, a card reader, secondary displays, a bet display, a credit display, etc. Credits can be deposited in or transferred from the EGM 100' electronically.

Figure 3E:
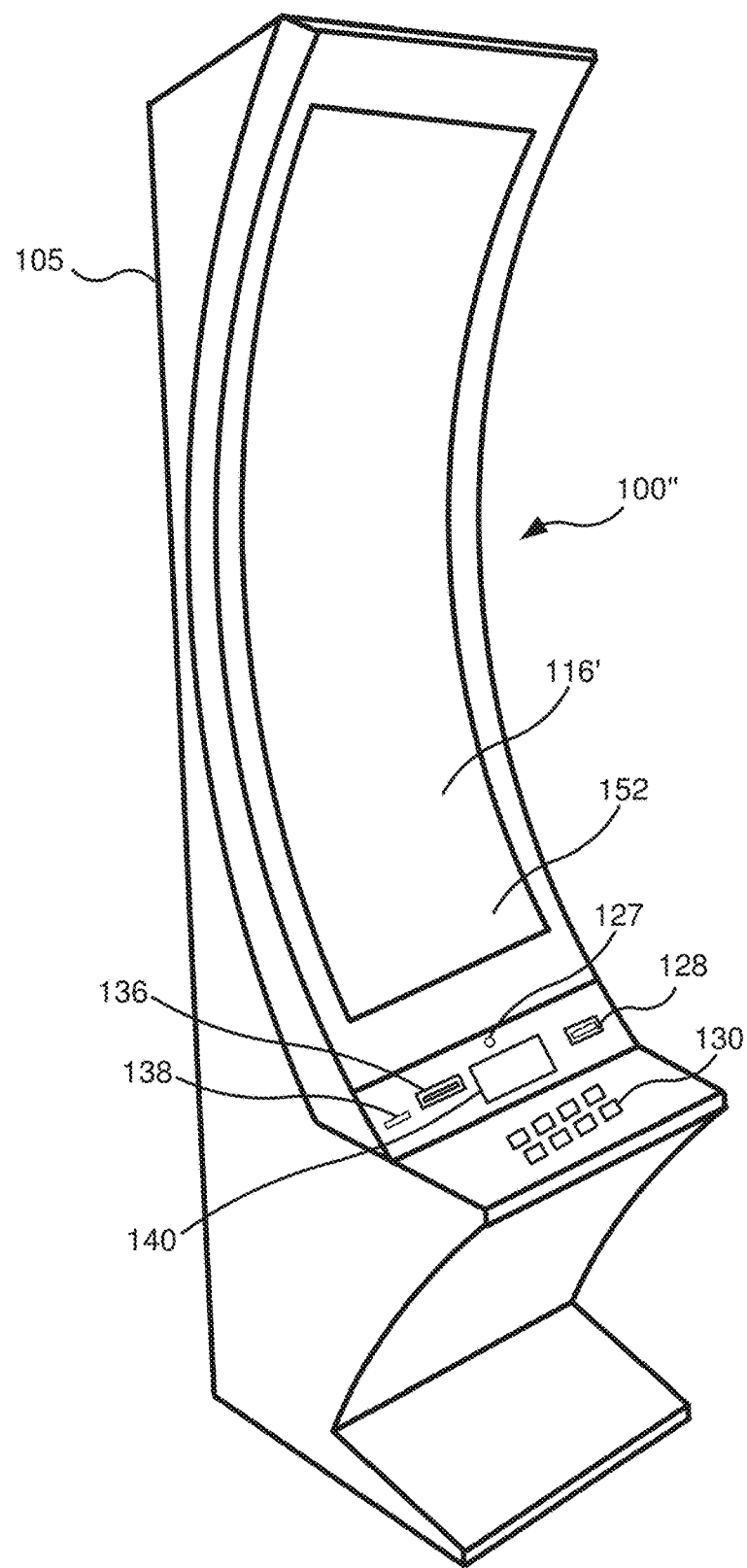
FIG. 3E is a perspective view of a gaming device according to further embodiments.

FIG. 3E illustrates a standalone EGM 100" having a different form factor from the EGM 100 illustrated in FIG. 3A. In particular, the EGM 100" is characterized by having a large, high aspect ratio, curved primary display device 116' provided in the housing 105, with no secondary display device. The primary display device 116' may include a digitizer 152 to allow touchscreen interaction with the primary display device 116'. The EGM 100" may further include a player tracking display 140, a plurality of input buttons 130, a bill/ticket acceptor 128, a card reader 138, and a ticket generator 136. The EGM 100" may further include one or more cameras 127 to enable facial recognition and/or motion tracking.

Although illustrated as EGMs, similar functions and/or operations as described herein may include wagering stations that may include electronic game tables, conventional game tables including those involving cards, dice and/or roulette, and/or other wagering stations such as sports book stations, video poker games, skill-based games, virtual casino-style table games, or other casino or non-casino style games. Further, EGMs according to embodiments herein may be implemented using mobile terminals, such as smart phones, tablets, and/or laptop computers, among others.

AR Controller

Figure 4:
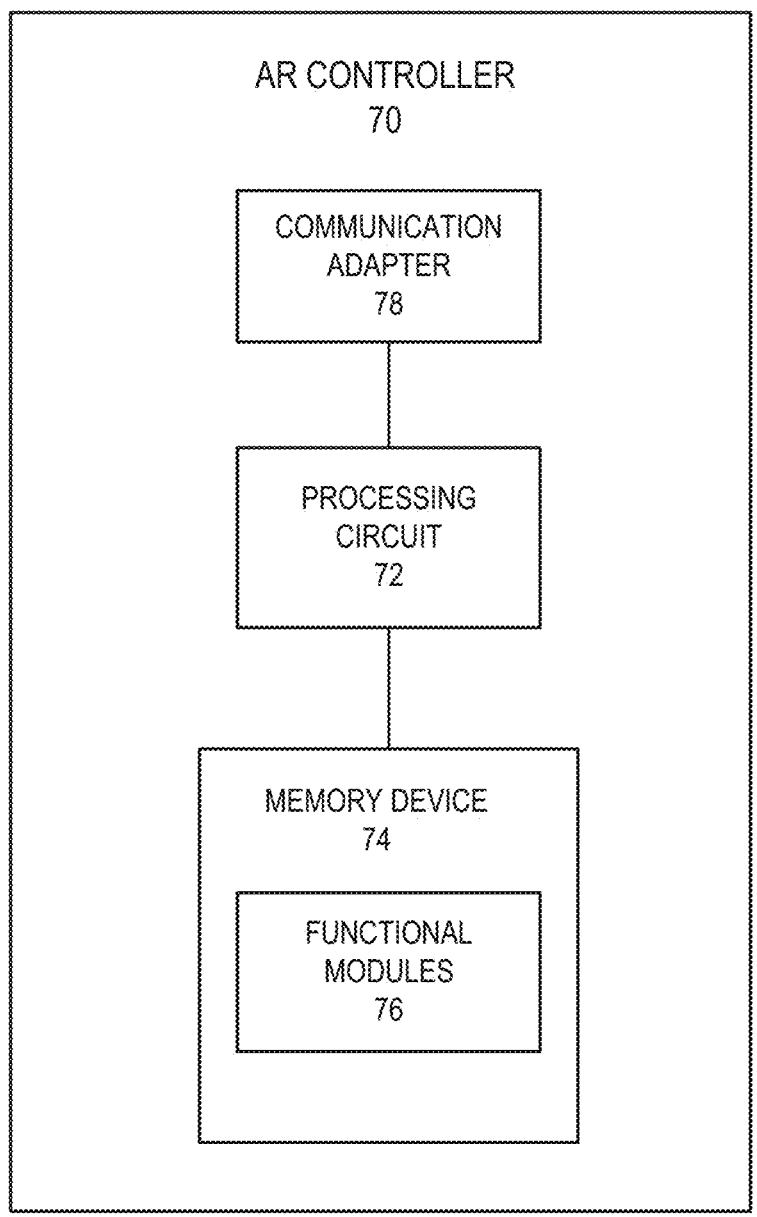
FIG. 4 is a block diagram that illustrates various components of an AR controller 70 according to some embodiments.

Reference is now made to FIG. 4, which is a block diagram that illustrates various components of an AR controller 70 according to some embodiments. As shown in FIG. 4, the AR controller 70 may include a processing circuit 72 that controls operations of the AR controller 70. Although illustrated as a single processing circuit 72, multiple special purpose and/or general purpose processors and/or processor cores may be provided in the AR controller 70. For example, the AR controller 70 may include one or more of a video processor, a signal processor, a sound processor and/or a communication controller that performs one or more control functions within the AR controller 70. The processing circuit 72 may be variously referred to as a "controller," "microcontroller," "microprocessor" or simply a "computer." The processing circuit may further include one or more application-specific integrated circuits (ASICs).

Various components of the AR controller 70 are illustrated in FIG. 4 as being connected to the processing circuit 72. It will be appreciated that the components may be connected to the processing circuit 72 through a system bus, a communication bus and controller, such as a USB controller and USB bus, a network interface, or any other suitable type of connection.

The AR controller 70 further includes a memory device 74 that stores one or more functional modules 76 for performing the operations described above.

The memory device 74 may store program code and instructions, executable by the processing circuit 72, to control the AR controller 70. The memory device 74 may include random access memory (RAM), which can include non-volatile RAM (NVRAM), magnetic RAM (MRAM), ferroelectric RAM (FeRAM) and other forms as commonly understood in the gaming industry. In some embodiments, the memory device 14 may include read only memory (ROM). In some embodiments, the memory device 14 may include flash memory and/or EEPROM (electrically erasable programmable read only memory). Any other suitable magnetic, optical and/or semiconductor memory may operate in conjunction with the gaming device disclosed herein.

The AR controller 70 may include a communication adapter 78 that enables the AR controller 70 to communicate with remote devices, such as EGMs 100, coin pusher games 90 and/or a player tracking server 45 (FIG. 1) over a wired and/or wireless communication network, such as a local area network (LAN), wide area network (WAN), cellular communication network, or other data communication network.

The AR controller 70 may include one or more internal or external communication ports that enable the processing circuit 72 to communicate with and to operate with internal or external peripheral devices, such as display screens, keypads, mass storage devices, microphones, speakers, and wireless communication devices. In some embodiments, internal or external peripheral devices may communicate with the processing circuit 72 through a universal serial bus (USB) hub (not shown) connected to the processing circuit 72.

Figure 5:
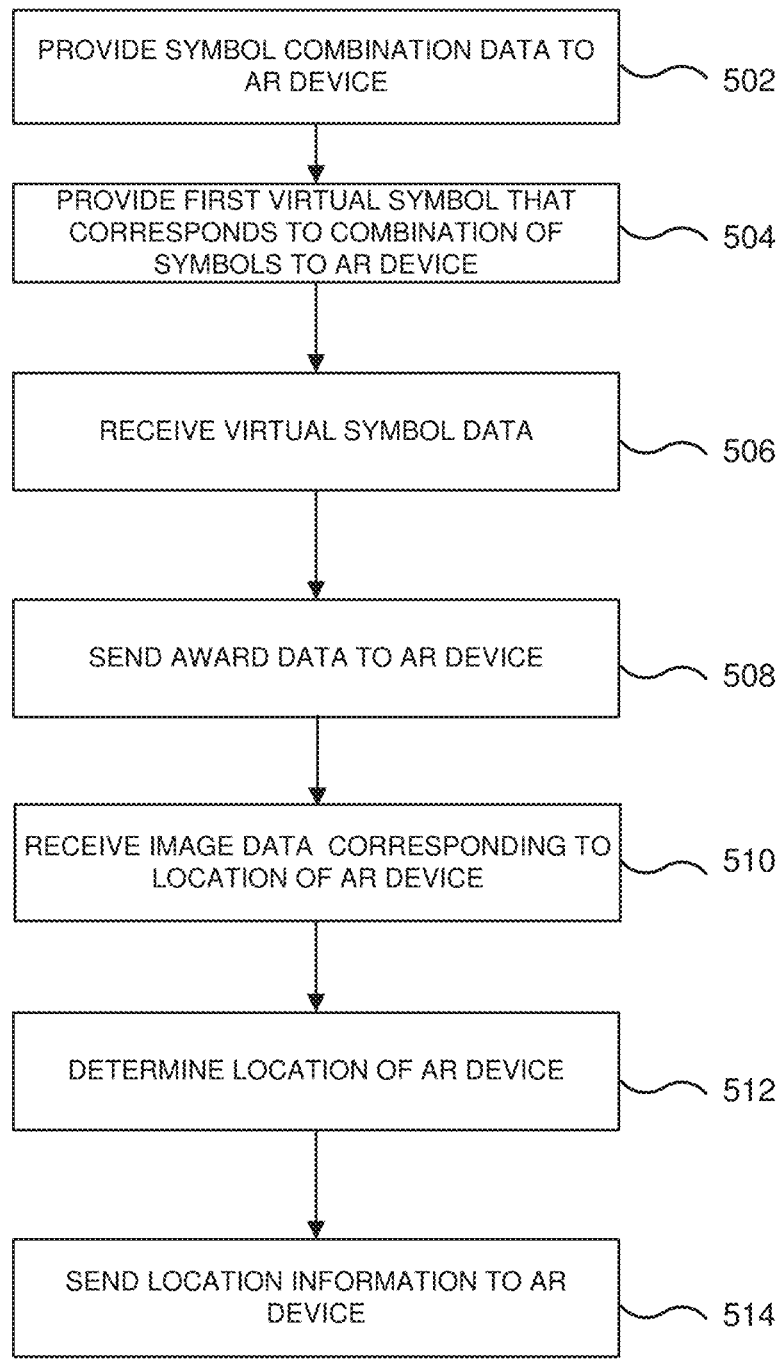
FIG. 5 is a flowchart illustrating operations of systems/methods according to some embodiments.

Reference is now made to FIG. 5, which is a flowchart illustrating operations of systems/methods according to some embodiments. Operations include provide, via the communication interface and to an augmented reality (AR) device that is associated with a user, symbol combination data (block 502). The symbol combination data may define a first combination of symbols that are displayable on a gaming device. Operations may include providing a first virtual symbol that is collected by the AR device responsive to an image capture device of the AR device capturing image data that corresponds to the first combination of symbols (block 504). For example, an otherwise non-winning combination of symbols may appear on a gaming machine.

In some embodiments, the AR device displays the first virtual symbol and the first combination of symbols on a display device of the AR device and stores virtual symbol data. If the combination of symbols corresponds to those sent to the AR device, then a virtual symbol that may be related to the gaming machine and/or a theme thereof may be displayed to the user by the AR device. In some embodiments, the virtual symbol may be displayed at or near the combination of symbols. In some embodiments, that virtual symbol may be a static image, while other embodiments provide that the virtual symbol may be dynamic and thus may be animated in accordance with properties corresponding to the virtual symbol.

Operations may include receiving, from the AR device, virtual symbol data indicating that the AR device has collected the first virtual symbol (block 506). In some embodiments, the virtual symbol may be collected by the user by virtue of the virtual symbol being displayed in response to the given combination of symbols of the gaming machine. Some embodiments provide that the virtual symbol may be collected by the user providing an input to the AR device that causes the collecting to occur. In such embodiments, the AR device may prompt the user to provide the input to collect the virtual symbol. For example, a prompt to provide the input may be a prompt identifying a portion of a touch screen display for the user to touch or a button on the AR device for the user to actuate.

Operations include sending, to the AR device, award data that corresponds to the first virtual symbol and that is redeemable by the user (block 508). Some embodiments provide that the award data corresponds to the virtual symbols. In some embodiments, the of combinations of symbols and the award data correspond to a commercial brand. For example, in a gaming device that is operable to provide gameplay corresponding to a specific brand of a dinosaur related entertainment franchise, the award data may be related to the dinosaur related franchise.

In some embodiments, the symbol combination data includes multiple different combinations of symbols. Each of the different combinations of symbols may correspond to a specific virtual symbol that may be represented and/or collected. Some embodiments provide that the virtual symbols are provided to the user in a given order that is independent of which of the combinations of symbols are captured by the AR device. For example, multiple virtual objects may be collected in an order that is predetermined and that is unaffected by the order in which the symbol combinations are presented by the gaming machine. In some embodiments, the virtual symbol data is sent by the AR device and includes information indicating that the AR device has collected the multiple virtual symbols.

Some embodiments provide that the combinations of symbols are not winning combinations on the gaming device. In some embodiments, virtual symbols may include first and second virtual symbols that correspond to one another. Some embodiments provide actions corresponding to the first virtual symbol may be affected by the second virtual symbol. For example, a first virtual symbol may be an animal, such as a raptor dinosaur, and the second virtual symbol may be a food item or type. In the current example, if the second virtual symbol is a vegetable or other non-meat item, the first virtual symbol raptor may react negatively or angrily. In contrast, it the second virtual symbol is a meat item, the first virtual symbol may consume the second virtual symbol. In some embodiments, a first virtual symbol may need to consume or be renewed by a satisfactory second virtual symbol to remain in the user's collection. Stated differently, virtual symbols may have a predetermined shelf life, after which the virtual symbol must be collected again. Some embodiments provide that multiple different virtual symbols may be presented to the user for selection. For example, the user may select which virtual symbol to collect from a group of related virtual symbols.

In some embodiments, the combinations of symbols are viewable on the gaming device and are viewable on a display device of the AR device responsive to the image capture device being directed at the gaming device. The virtual symbols may include graphical content that is viewable on the display device of the AR device responsive to the image capture device being directed at the gaming device.

In some embodiments, the virtual symbols include a collection of virtual symbols that are each associated with a commercial brand.

Some embodiments provide that the gaming device is a sports betting terminal and/or kiosk. In such embodiments, the virtual symbols include team logos that correspond to teams in a sports organization that is associated with the commercial brand. In some embodiments, the award data is sent responsive to the AR device collecting a given quantity of the team logos. Some embodiments provide that the award data is a voucher for the user to play a machine that corresponds to the commercial brand. In some embodiments, the voucher includes data that is redeemable by the user at the machine. Such data may be in the form of a unique identifier that may be encoded in an image for optical scanning, in a text-based link that may be read, and/or as a readable electromagnetically encoded identifier, such as RFID. Some embodiments provide that the award includes a voucher for the user to access a casino attraction that is unrelated to the commercial brand and/or the gaming device.

In some embodiments, image data may be received from the AR device (block 510). The image data may correspond to a location that is captured by the image capture device in the AR device. In some embodiments, the image data may include an identification of the first virtual symbol and/or an indication that the first virtual symbol is collectable at the location that is captured by the image capture device.

Some embodiments provide that the image data that is captured using the image capture device may be used to determine a location of the AR device (block 512) and to send, to the AR device, information regarding the location of the AR device and a location of the gaming device that displays the first combination of symbols (block 514).

Figure 6:
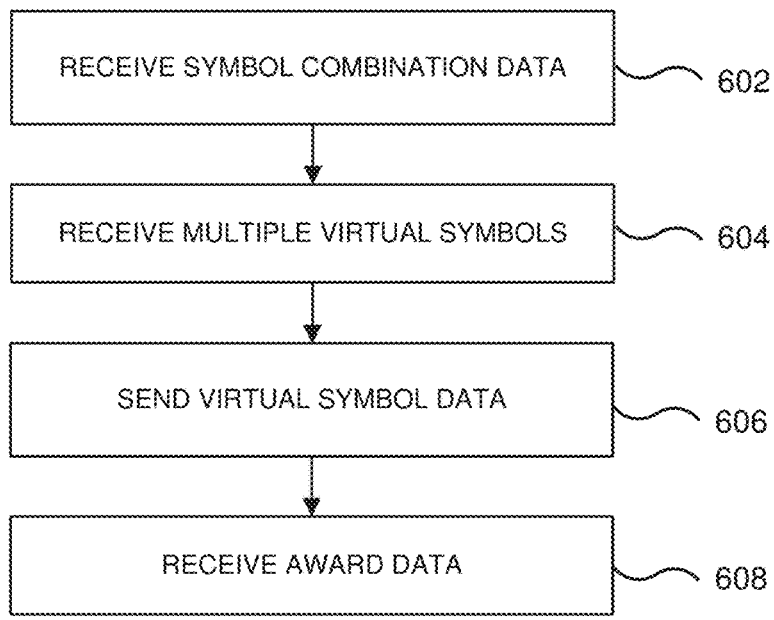
FIG. 6 is a flowchart illustrating operations of systems/methods according to some embodiments.

Brief reference is now made to FIG. 6, which is a flowchart illustrating operations of systems/methods according to some embodiments. Some embodiments include receiving, via a communication interface in an AR device and from a server, symbol combination data that defines combinations of symbols that are displayable on a gaming device and that are viewable on a display of the AR device (block 602). In some embodiments, combinations of symbols are non-winning combinations of symbols on the gaming device.

Operations include receiving, via the communication interface in the AR device and from the server, multiple virtual symbols that correspond to the combinations of symbols and that are collected by the AR device responsive to an image capture device of the AR device capturing image data that corresponds to combinations of symbols (block 604). Some embodiments provide that the virtual symbols are part of a collection of virtual symbols that are each associated with a specific commercial brand. Collected ones of the virtual symbols may be displayed on the AR device in response to the image capture device being directed to the gaming device.

Operations include sending, via the communication interface in the AR device and to the server, virtual symbol data indicating which of the virtual symbols that the AR device has collected (block 606). Some embodiments include receiving, by the AR device, award data that corresponds to the ones of the virtual symbols that have been collected and that is redeemable by a user of the AR device (block 608). Some embodiments provide that the award data is a voucher that is received by the AR device. The voucher may include data that corresponds to the voucher and that is used to redeem the voucher at a machine that corresponds to the commercial brand.

In some embodiments, image data that corresponds to an image of one of the virtual symbols and location information corresponding to the virtual symbols is captured by the AR device.

Figure 7:
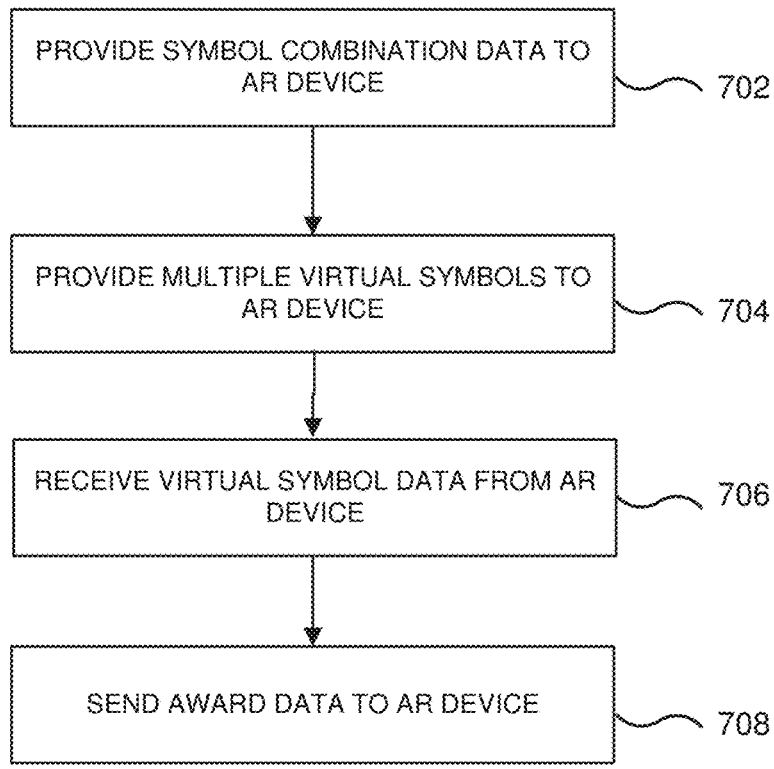
FIG. 7 is a flowchart illustrating operations of systems/methods according to some embodiments.

Reference is now made to FIG. 7, which is a flowchart illustrating operations of systems/methods according to some embodiments. Operations include providing, to an augmented reality (AR) device that is associated with a user, symbol combination data that defines a plurality of combinations of symbols that are displayable on a gaming device (block 702). In some embodiments, combinations of symbols comprise non-winning combinations of symbols in the gaming device.

Operations include providing, to the AR device, multiple virtual symbols that correspond to the combinations of symbols and that are collected by the AR device responsive to an image capture device of the AR device capturing image data that corresponds to ones of the combinations of symbols (block 704). In some embodiments, the AR device displays one of the virtual symbols and a corresponding one of the combinations of symbols on a display device thereof. In some embodiments, virtual symbols include a first virtual symbol and a second virtual symbol that is collected after the first virtual symbol. Some embodiments provide that an action of the first virtual symbol is determined based on content of the second virtual symbol.

Operations include receiving, from the AR device, virtual symbol data indicating that the AR device has collected one of the virtual symbols (block 706). Operations further include sending, to the AR device, award data that corresponds to the one of the virtual symbols that has been collected (block 708). In some embodiments, the award data is redeemable by the user.

Augmented Reality Applications

In some embodiments, systems and methods herein may be implemented using an AR device that is a mobile terminal, such as a mobile phone or computer tablet. In such embodiments, the user may cause the mobile terminal to receive and install a computer software application for performing operations described herein.

Figure 8:
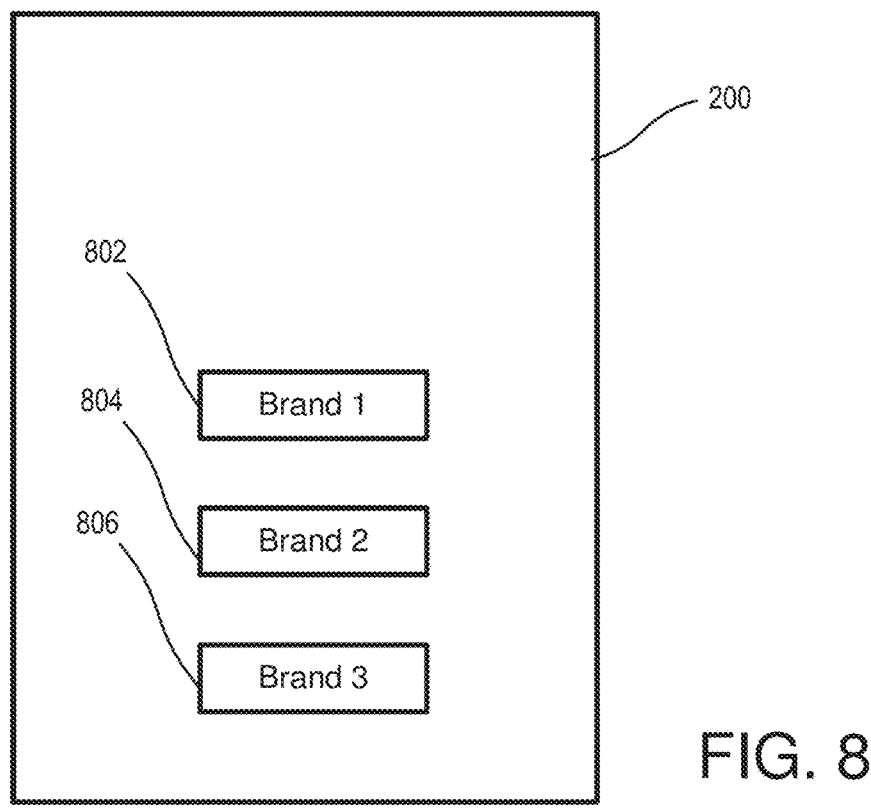
FIG. 8 is a schematic screenshot illustrating using an application according to some embodiments of the inventive concept.
Figure 9:
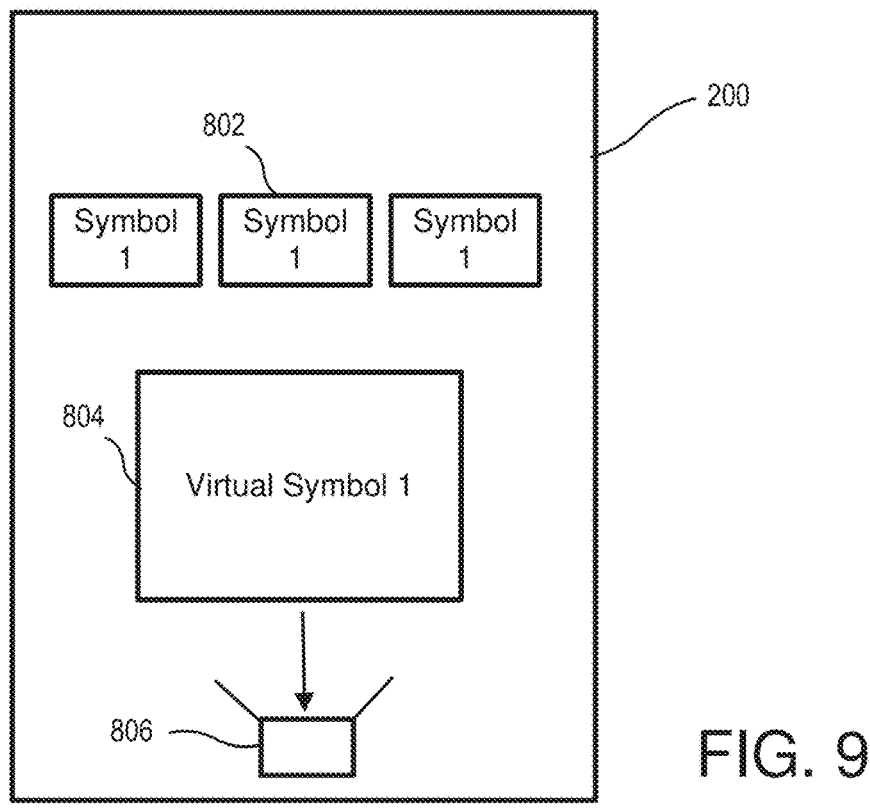
FIG. 9 is a schematic screenshot illustrating using an application according to some embodiments of the inventive concept.

Reference is now made to FIG. 8, which is a schematic screenshot illustrating using an application according to some embodiments of the inventive concept. In some embodiments, the application may provide the user with a list of brands and/or gaming devices that are associated with brands that users may play to use the application. Once the player is at a participating one of the gaming devices corresponding to the selected brand, the user may direct the camera of the AR device 200 to the gaming device display. For example, brief reference is now made to FIG. 9, which is a schematic screenshot illustrating using an application according to some embodiments of the inventive concept. Responsive to the AR device 200 being directed to the gaming device, the AR device 200 may display one or more combinations of symbols 802 that, when displayed by the gaming device, may provide the user with a virtual symbol 804 to collect into a virtual data repository 806 that contains the data corresponding to the virtual symbols that have been collected. Responsive to one of the combinations of symbols being displayed on the gaming device during play, the user may capture the image of the combination of symbols using the AR device 200 and may collect a corresponding virtual symbol.

Figure 10:
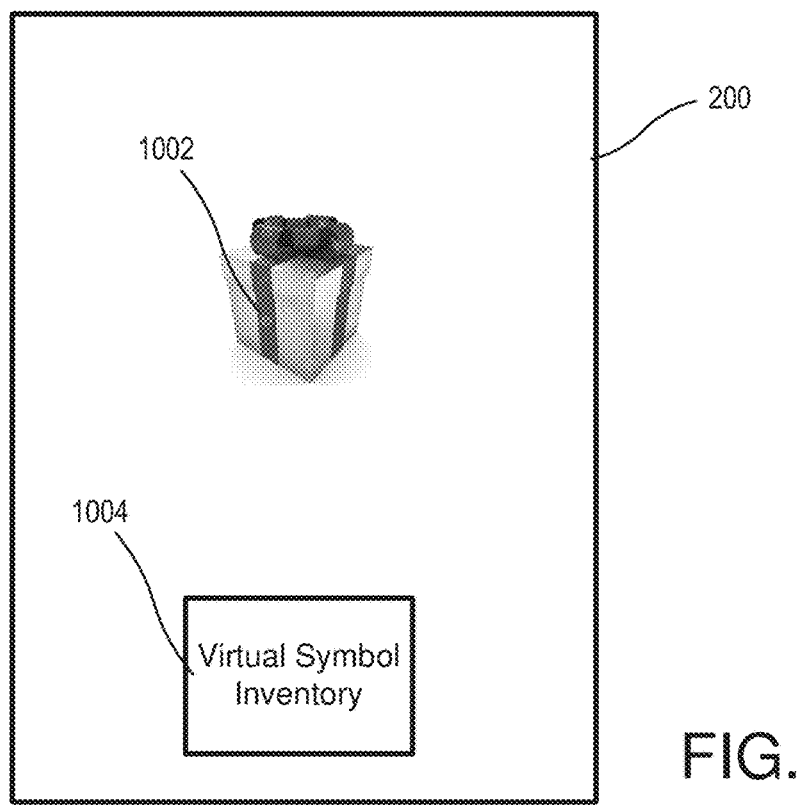
FIG. 10 is a schematic screenshot illustrating using an application according to some embodiments of the inventive concept.

Brief reference is now made to FIG. 10, which is a schematic screenshot illustrating using an application according to some embodiments of the inventive concept. Once all of the virtual symbols 804 in a given group have been collected by the user, the user may redeem an award 1002. The award 102 may include a prize such as a voucher or coupon for playing the gaming device that corresponds to the brand and/or to another gaming or non-gaming device in the casino or online. In some embodiments, the award 1002 may include merchandise that corresponds to the brand.

Figure 11:
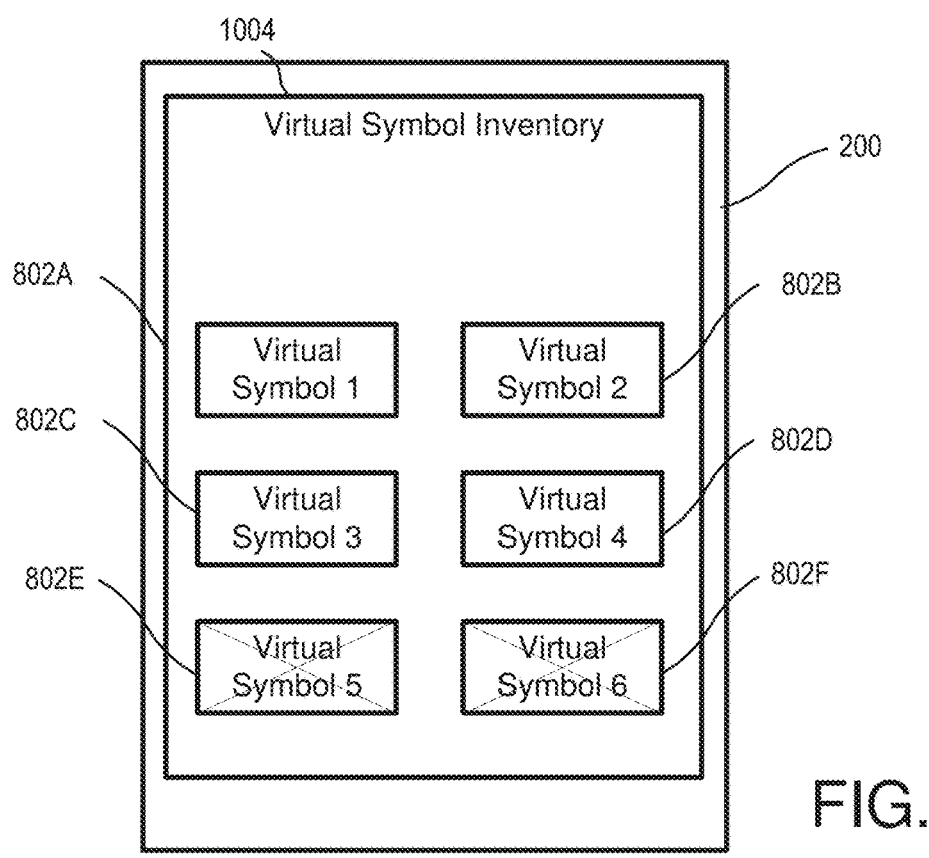
FIG. 11 is a schematic screenshot illustrating using an application according to some embodiments of the inventive concept.

In some embodiments, the user may be able to determine their progress in collecting the virtual symbols by accessing a virtual symbol inventory 1004. Brief reference is now made to FIG. 11, which is a schematic screenshot illustrating using an application according to some embodiments of the inventive concept. As illustrated, the virtual symbol inventory 1004 may include indications corresponding to which virtual symbols of the collection have been collected and which ones still are uncollected. For example, virtual symbols 1-4 (802A-802D) are illustrated as having been collected and thus in the virtual symbol inventory 1004. In contrast, virtual symbols 5 and 6 802E, 802F are illustrated as not having been collected yet by virtue of the diagonal lines therethrough. In some embodiments, other types of modifications to illustrate the uncollected status may be used, such as blurring, gray scale, and/or other visually discernable graphical modifications.

Figure 12A:
FIGS. 12A-12C are screenshots illustrating using an application displaying virtual symbols according to some embodiments of the inventive concept.
Figure 12B:
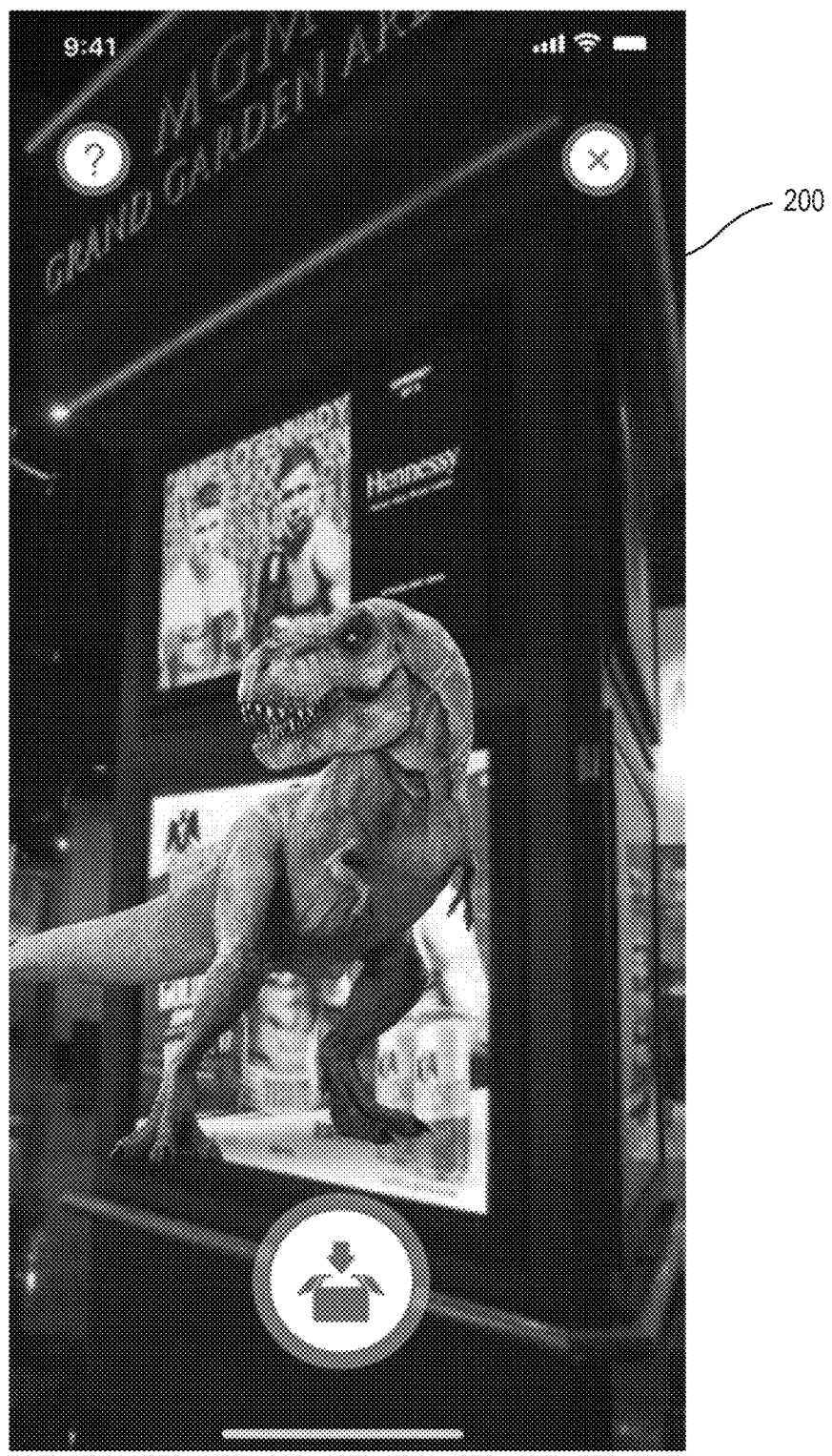
Figure 12C:

In some embodiments, once virtual symbols are collected, such as capturing a T-Rex in a dinosaur game, the AR device 200 may display the virtual symbols 802 in a variety of ways. For example, brief reference is now made to FIGS. 12A-12C, which are screenshots illustrating using an application displaying virtual symbols according to some embodiments of the inventive concept. Referring to FIG. 12A, the virtual object may be a T-Rex and may be displayed by the AR device 200 to the user being on the casino floor. Similarly, referring to FIG. 12B, the virtual symbol may be displayed using the AR device 200 to the user as being near or on signage and/or other structures within a casino. Yet further, referring to FIG. 12C, the virtual symbol may be displayed as riding on a cashout ticket being dispensed to the user.

In some embodiments, the user may be able to log into the application directly and/or using a social media and/or loyalty account, among others. In addition to monitoring the user's own progress in collecting the virtual symbols, the user may post updates regarding collected virtual symbols to other users of the application.

Other EGM Features

Embodiments described herein may be implemented in various configurations for EGMs 100s, including but not limited to: (1) a dedicated EGM, wherein the computerized instructions for controlling any games (which are provided by the EGM) are provided with the EGM prior to delivery to a gaming establishment; and (2) a changeable EGM, where the computerized instructions for controlling any games (which are provided by the EGM) are downloadable to the EGM through a data network when the EGM is in a gaming establishment. In some embodiments, the computerized instructions for controlling any games are executed by at least one central server, central controller or remote host. In such a "thin client" embodiment, the central server remotely controls any games (or other suitable interfaces) and the EGM is utilized to display such games (or suitable interfaces) and receive one or more inputs or commands from a player. In another embodiment, the computerized instructions for controlling any games are communicated from the central server, central controller or remote host to a EGM local processor and memory devices. In such a "thick client" embodiment, the EGM local processor executes the communicated computerized instructions to control any games (or other suitable interfaces) provided to a player.

In some embodiments, an EGM may be operated by a mobile device, such as a mobile telephone, tablet other mobile computing device. For example, a mobile device may be communicatively coupled to an EGM and may include a user interface that receives user inputs that are received to control the EGM. The user inputs may be received by the EGM via the mobile device.

In some embodiments, one or more EGMs in a gaming system may be thin client EGMs and one or more EGMs in the gaming system may be thick client EGMs. In another embodiment, certain functions of the EGM are implemented in a thin client environment and certain other functions of the EGM are implemented in a thick client environment. In one such embodiment, computerized instructions for controlling any primary games are communicated from the central server to the EGM in a thick client configuration and computerized instructions for controlling any secondary games or bonus functions are executed by a central server in a thin client configuration.

The present disclosure contemplates a variety of different gaming systems each having one or more of a plurality of different features, attributes, or characteristics. It should be appreciated that a "gaming system" as used herein refers to various configurations of: (a) one or more central servers, central controllers, or remote hosts; (b) one or more EGMs; and/or (c) one or more personal EGMs, such as desktop computers, laptop computers, tablet computers or computing devices, personal digital assistants (PDAs), mobile telephones such as smart phones, and other mobile computing devices.

In certain such embodiments, computerized instructions for controlling any games (such as any primary or base games and/or any secondary or bonus games) displayed by the EGM are executed by the central server, central controller, or remote host. In such "thin client" embodiments, the central server, central controller, or remote host remotely controls any games (or other suitable interfaces) displayed by the EGM, and the EGM is utilized to display such games (or suitable interfaces) and to receive one or more inputs or commands. In other such embodiments, computerized instructions for controlling any games displayed by the EGM are communicated from the central server, central controller, or remote host to the EGM and are stored in at least one memory device of the EGM. In such "thick client" embodiments, the at least one processor of the EGM executes the computerized instructions to control any games (or other suitable interfaces) displayed by the EGM.

In some embodiments in which the gaming system includes: (a) an EGM configured to communicate with a central server, central controller, or remote host through a data network; and/or (b) a plurality of EGMs configured to communicate with one another through a data network, the data network is an internet or an intranet. In certain such embodiments, an internet browser of the EGM is usable to access an internet game page from any location where an internet connection is available. In one such embodiment, after the internet game page is accessed, the central server, central controller, or remote host identifies a player prior to enabling that player to place any wagers on any plays of any wagering games. In one example, the central server, central controller, or remote host identifies the player by requiring a player account of the player to be logged into via an input of a unique username and password combination assigned to the player. It should be appreciated, however, that the central server, central controller, or remote host may identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the EGM, such as by identifying the MAC address or the IP address of the internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the internet browser of the EGM.

It should be appreciated that the central server, central controller, or remote host and the EGM are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile internet network), or any other suitable medium. It should be appreciated that the expansion in the quantity of computing devices and the quantity and speed of internet connections in recent years increases opportunities for players to use a variety of EGMs to play games from an ever-increasing quantity of remote sites. It should also be appreciated that the enhanced bandwidth of digital wireless communications may render such technology suitable for some or all communications, particularly if such communications are encrypted. Higher data transmission speeds may be useful for enhancing the sophistication and response of the display and interaction with players.

Embodiments provided herein may provide improved accessibility to wagering stations by including additional user interface technologies, such as augmented reality. Such embodiments may improve technological efficiency by coordinating the augmented reality with examples of different types of wagering stations.

Further Definitions and Embodiments

In the above-description of various embodiments, various aspects may be illustrated and described herein in any of a number of patentable classes or contexts including any new and useful process, machine, manufacture, or composition of matter, or any new and useful improvement thereof. Accordingly, various embodiments described herein may be implemented entirely by hardware, entirely by software (including firmware, resident software, micro-code, etc.) or by combining software and hardware implementation that may all generally be referred to herein as a "circuit," "module," "component," or "system." Furthermore, various embodiments described herein may take the form of a computer program product comprising one or more computer readable media having computer readable program code embodied thereon.

Any combination of one or more computer readable media may be used. The computer readable media may be a computer readable signal medium or a non-transitory computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible non-transitory medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Various embodiments were described herein with reference to flowchart illustrations and/or block diagrams of methods, apparatus (systems), devices and computer program products according to various embodiments described herein. It will be understood that each block of the flowchart illustrations and/or block diagrams, and combinations of blocks in the flowchart illustrations and/or block diagrams, can be implemented by computer program instructions. These computer program instructions may be provided to a processing circuit of a general purpose computer, special purpose computer, or other programmable data processing apparatus to produce a machine, such that the instructions, which execute via the processing circuit of the computer or other programmable instruction execution apparatus, create a mechanism for implementing the functions/acts specified in the flowchart and/or block diagram block or blocks.

These computer program instructions may also be stored in a non-transitory computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be designated as "/". Like reference numbers signify like elements throughout the description of the figures.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

What is claimed is:

1. A system comprising:
   a communication interface;
   a processing circuit; and
   a memory coupled to the processing circuit, the memory comprising machine readable instructions that, when executed by the processing circuit, cause the processing circuit to:
   provide, using the processing circuit via the communication interface and to an augmented reality (AR) device that is associated with a user, symbol combination data that defines a first combination of symbols that are displayable on a gaming device;
   provide, via the communication interface and to the AR device, a first virtual symbol that is collected by the AR device responsive to an image capture device of the AR device capturing image data that corresponds to the first combination of symbols, wherein the AR device displays the first virtual symbol and the first combination of symbols on a display device of the AR device and stores virtual symbol data;
   receive, into the processing circuit and from the AR device, virtual symbol data indicating that the AR device has collected the first virtual symbol;
   send, to the AR device, award data that corresponds to the first virtual symbol and that is redeemable by the user, and
   receive, via the communication interface and from the AR device, image data that is at a location and that is captured by the image capture device in the AR device, the image data comprising an identification of the first virtual symbol and an indication that the first virtual symbol is collectable at the location.

2. The system of claim 1, wherein the processing circuit is further caused to:
   send, via the communication interface and to the AR device, symbol combination data comprising a plurality of combinations of symbols that comprises the first combination of symbols and a plurality of virtual symbols that comprises the first virtual symbol,
   wherein the virtual symbol data indicates that the AR device has collected the plurality of virtual symbols, and
   wherein the award data corresponds to the plurality of virtual symbols.

3. The system of claim 2, wherein the plurality of virtual symbols, the plurality of combinations of symbols and the award data correspond to a commercial brand.

4. The system of claim 2, wherein ones of the plurality of combinations of symbols comprise combinations of symbols that are not winning combinations on the gaming device.

5. The system of claim 2, wherein the plurality of virtual symbols comprises a second virtual symbol that corresponds to the first virtual symbol, and
   wherein, responsive to the AR device collecting the second virtual symbol, a reaction thereto by the first virtual symbol is caused.

6. The system of claim 2, wherein ones of the plurality of combinations of symbols are viewable on the gaming device,
   wherein the ones of the plurality of combinations of symbols are viewable on a display device of the AR device responsive to the image capture device being directed at the gaming device, and
   wherein ones of the plurality of virtual symbols comprise graphical content that is viewable on the display device of the AR device responsive to the image capture device being directed at the gaming device.

7. The system of claim 2, wherein the plurality of virtual symbols comprises a collection of virtual symbols that are each associated with a commercial brand.

8. The system of claim 7, wherein the gaming device comprises a sports betting terminal, and
   wherein the virtual symbols comprise team logos that correspond to teams in a sports organization that is associated with the commercial brand.

9. The system of claim 8, wherein the award data is sent responsive to the AR device collecting a given quantity of the team logos.

10. The system of claim 7, wherein causing the processing circuit to send the award data further causes the processing circuit to send a voucher, to the AR device, for the user to play a machine that corresponds to the commercial brand, wherein the voucher comprises data that is redeemable by the user at the machine.

11. The system of claim 7, wherein causing the processing circuit to send the award data further causes the processing circuit to send a voucher, to the AR device, for the user to access a casino attraction that is unrelated to the commercial brand.

12. The system of claim 1, wherein the processing circuit is further caused to:
    receive image data from the AR device that is captured using the image capture device in the AR device;
    determine a location of the AR device based on the image data that is received from the AR device; and
    send, to the AR device, information regarding the location of the AR device and a location of the gaming device that displays the first combination of symbols.

13. A method comprising:
    receiving, via a communication interface in an AR device and from a server, symbol combination data that defines a plurality of combinations of symbols that are displayable on a gaming device and that are viewable on a display of the AR device;
    receiving, via the communication interface in the AR device and from the server, a plurality of virtual symbols that correspond to the plurality of combinations of symbols and that are collected by the AR device responsive to an image capture device of the AR device capturing image data that corresponds to ones of the plurality of combinations of symbols;
    sending, via the communication interface in the AR device and to the server, virtual symbol data indicating which of the plurality of virtual symbols that the AR device has collected;
    sending, via the communication interface in the AR device, image data that is at a location and that is captured by the image capture device in the AR device, the image data comprising an identification of a first virtual symbol one of the plurality of virtual symbols and an indication that the first virtual symbol is collectable at the location; and
    receiving, by the AR device, award data that corresponds to ones of the plurality of virtual symbols that have been collected and that is redeemable by a user of the AR device.

14. The method of claim 13, wherein the plurality of virtual symbols comprises a collection of virtual symbols that are each associated with a commercial brand.

15. The method of claim 14, wherein the award data comprises a voucher that is received by the AR device, wherein the voucher comprises data that corresponds to the voucher and that is used to redeem the voucher at a machine that corresponds to the commercial brand.

16. The method of claim 13, the method further comprising:
capturing image data that corresponds to an image of one of the plurality of virtual symbols and location information corresponding to the one of the plurality of virtual symbols.

17. The method of claim 16, further comprising displaying, by the AR device, a collected one of the plurality of virtual symbols responsive to the image capture device being directed to the gaming device.

18. The method of claim 13, wherein the plurality of combinations of symbols comprise non-winning combinations of symbols on the gaming device.

19. A system comprising:
a processing circuit; and
a memory coupled to the processing circuit, the memory comprising machine readable instructions that, when executed by the processing circuit, cause the processing circuit to:
provide, using the processing circuit and to an augmented reality (AR) device that is associated with a user, symbol combination data that defines a plurality of combinations of symbols that are displayable on a gaming device;
provide, to the AR device, a plurality of virtual symbols that correspond to the plurality of combinations of symbols and that are collected by the AR device responsive to an image capture device of the AR device capturing image data that corresponds to ones of the plurality of combinations of symbols, wherein the AR device displays one of the plurality of virtual symbols and a corresponding one of the plurality of combinations of symbols on a display device of the AR device;
receive, by the processing circuit and from the AR device, virtual symbol data indicating that the AR device has collected one of the plurality of virtual symbols;
send, to the AR device, award data that corresponds to the one of the virtual symbols that has been collected, the award data being redeemable by the user; and
receive, from the AR device, image data that is at a location and that is captured by the image capture device in the AR device, the image data comprising an identification of a first virtual symbol of the plurality of virtual symbols and an indication that the first virtual symbol is collectable at the location,
wherein the plurality of combinations of symbols comprise non-winning combinations of symbols in the gaming device,
wherein the plurality of virtual symbols comprises a first virtual symbol and a second virtual symbol that is collected after the first virtual symbol, and
wherein an action of the first virtual symbol is determined based on content of the second virtual symbol.

* * * * *